US012114323B2

(12) United States Patent
Mondet et al.

(10) Patent No.: US 12,114,323 B2
(45) Date of Patent: Oct. 8, 2024

(54) SOUNDING REFERENCE SIGNAL COORDINATION FOR PERIODIC TRAFFIC

(71) Applicant: QUALCOMM Incorporated, San Diego, CA (US)

(72) Inventors: Mickael Mondet, Louannec (FR); Prashanth Haridas Hande, San Diego, CA (US); Hyun Yong Lee, San Diego, CA (US); Peerapol Tinnakornsrisuphap, San Diego, CA (US); Hussein Metwaly Saad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/522,692

(22) Filed: Nov. 9, 2021

(65) Prior Publication Data

US 2023/0146014 A1    May 11, 2023

(51) Int. Cl.
*H04L 5/00* (2006.01)
*H04W 72/1268* (2023.01)
*H04W 72/23* (2023.01)

(52) U.S. Cl.
CPC .......... *H04W 72/23* (2023.01); *H04L 5/0048* (2013.01); *H04W 72/1268* (2013.01)

(58) Field of Classification Search
CPC .................................................. H04W 72/1268
See application file for complete search history.

(56) References Cited

U.S. PATENT DOCUMENTS

| 2009/0232118 A1 | 9/2009 | Wang et al. |
| 2016/0234735 A1* | 8/2016 | Kubota ................. H04W 48/14 |
| 2023/0054832 A1* | 2/2023 | Wang .................... H04L 5/0053 |

(Continued)

FOREIGN PATENT DOCUMENTS

WO    WO-2021174238 A2    9/2021

OTHER PUBLICATIONS

Huawei, et al., "SRS Enhancements in Rel-17", 3GPP TSG RAN WG1 Meeting #104bis-e, R1-2102338, 3GPP Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 18 Pages, XP052177058, pp. 1, 6, Section 4.1, Figure 3.

(Continued)

*Primary Examiner* — Ajit Patel
(74) *Attorney, Agent, or Firm* — Holland & Hart LLP/Qualcomm Incorporated

(57) ABSTRACT

Methods, systems, and devices for wireless communications at a user equipment (UE) are described. A user equipment (UE) may receive a downlink control information scheduling transmission of periodic multimedia traffic bursts to the UE with a first periodic cadence. The UE may receive control signaling from the UE indicating that the UE is to periodically transmit sounding reference signals to the base station according to a second cadence, which may be a multiple of the first periodic cadence. Additionally or alternatively, the UE may receive control signaling indicating that the UE is to transmit a sounding reference signal at a time associated with a beginning of at least one of the periodic multimedia traffic bursts. The UE may transmit one or more sounding reference signals to the base station in accordance with the control signaling.

15 Claims, 15 Drawing Sheets

(56) References Cited

U.S. PATENT DOCUMENTS

2023/0232339 A1* 7/2023 Fakoorian ........... H04W 52/325
　　　　　　　　　　　　　　　　　　455/522
2023/0337157 A1* 10/2023 Kim ................. H04W 56/0045

OTHER PUBLICATIONS

International Search Report and Written Opinion—PCT/US2022/077499—ISA/EPO—Jan. 30, 2023.

* cited by examiner

DCI 220

Control Signaling 225

Sounding Reference Signal 230

Multimedia Data Traffic 235

SOUNDING REFERENCE SIGNAL COORDINATION FOR PERIODIC TRAFFIC

FIELD OF TECHNOLOGY

The following relates to wireless communications at a user equipment (UE), including sounding reference signal coordination for periodic traffic.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications, a UE may transmit sounding reference signals to a base station. However, methods for such sounding reference transmission schemes may be improved.

SUMMARY

The described techniques relate to improved methods, systems, devices, and apparatuses that support sounding reference signal coordination for periodic traffic. Generally, the described techniques provide for transmission of sounding reference signals (e.g., for channel estimation purposes). A user equipment (UE) may receive downlink control information (DCI) that may schedule periodic downlink bursts of traffic (e.g., multimedia traffic) to the UE. The UE may further receive control signaling indicating that the UE is to transmit sounding reference signals (SRSs) to the base station (e.g., in accordance with a second periodic cadence that may be a multiple or related to the cadence of the downlink traffic). The UE may transmit the SRSs to the base station (e.g., in accordance with the second periodic cadence). Additionally or alternatively, the UE may receive control signaling indicating that the UE is to transmit an SRS at a time associated with the beginning of one or more of the periodic downlink bursts of traffic, and the UE may transmit the SRS based on such control signaling. For example, the UE may transmit the SRS either before or after the beginning of one or more of the periodic downlink bursts of traffic, based on one or more factors (e.g., a processing time associated with the SRS, an earliest available slots, one or more other factors, or any combination thereof).

A method for wireless communications at a user equipment (UE) is described. The method may include receiving, from a base station, a downlink control information message scheduling periodic downlink bursts of multimedia data traffic, the periodic downlink bursts of multimedia data traffic having a first periodic cadence, receiving, from the base station, control signaling that indicates that the UE is to periodically transmit sounding reference signals to the base station in accordance with a second periodic cadence, where the second periodic cadence is a multiple of the first periodic cadence, and transmitting the sounding reference signals to the base station in accordance with the second periodic cadence.

An apparatus for wireless communications at a UE is described. The apparatus may include a processor, memory coupled with the processor, and instructions stored in the memory. The instructions may be executable by the processor to cause the apparatus to receive, from a base station, a downlink control information message scheduling periodic downlink bursts of multimedia data traffic, the periodic downlink bursts of multimedia data traffic having a first periodic cadence, receive, from the base station, control signaling that indicates that the UE is to periodically transmit sounding reference signals to the base station in accordance with a second periodic cadence, where the second periodic cadence is a multiple of the first periodic cadence, and transmit the sounding reference signals to the base station in accordance with the second periodic cadence.

Another apparatus for wireless communications at a UE is described. The apparatus may include means for receiving, from a base station, a downlink control information message scheduling periodic downlink bursts of multimedia data traffic, the periodic downlink bursts of multimedia data traffic having a first periodic cadence, means for receiving, from the base station, control signaling that indicates that the UE is to periodically transmit sounding reference signals to the base station in accordance with a second periodic cadence, where the second periodic cadence is a multiple of the first periodic cadence, and means for transmitting the sounding reference signals to the base station in accordance with the second periodic cadence.

A non-transitory computer-readable medium storing code for wireless communications at a UE is described. The code may include instructions executable by a processor to receive, from a base station, a downlink control information message scheduling periodic downlink bursts of multimedia data traffic, the periodic downlink bursts of multimedia data traffic having a first periodic cadence, receive, from the base station, control signaling that indicates that the UE is to periodically transmit sounding reference signals to the base station in accordance with a second periodic cadence, where the second periodic cadence is a multiple of the first periodic cadence, and transmit the sounding reference signals to the base station in accordance with the second periodic cadence.

Some examples of the method, apparatuses, and non-transitory computer-readable medium described herein may further include operations, features, means, or instructions for aligning, within a first threshold, a beginning of a second period of the second periodic cadence with a beginning of a first period of the first periodic cadence and aligning, within a second threshold, an end of the period of the second periodic cadence with an end of a second period of the first periodic cadence.

Some examples of the method, apparatuses, and non-transitory computer-readable medium described herein may further include operations, features, means, or instructions for determining a set of multiple sub-periods of the second periodic cadence, where at least one of the set of multiple sub-periods may be non-uniform as compared to one or more other sub-periods of the set of multiple sub-periods, and one or more transitions between sub-periods align, within a second threshold, with the periodic downlink bursts of multimedia data traffic and transmitting a set of multiple additional sounding reference signals within a period of the second periodic cadence in accordance with the set of multiple sub-periods.

In some examples of the method, apparatuses, and non-transitory computer-readable medium described herein, the control signaling further indicates a value for a sounding reference signal cadence parameter that defines the second periodic cadence.

Some examples of the method, apparatuses, and non-transitory computer-readable medium described herein may further include operations, features, means, or instructions for receiving control signaling, from the base station, that indicates a frequency hopping scheme based on a first counter corresponding to the second periodic cadence, a number of sub-periods contained within the second periodic cadence, and a sub-period index that identifies a sub-period contained within the second periodic cadence and transmitting the sounding reference signals based on the frequency hopping scheme.

Some examples of the method, apparatuses, and non-transitory computer-readable medium described herein may further include operations, features, means, or instructions for receiving control signaling, from the base station, that indicates a sounding reference signal cadence parameter associated with the second periodic cadence and including a first value measured in hertz that defines the second periodic cadence and transmitting the sounding reference signals based on the sounding reference signal cadence parameter.

Some examples of the method, apparatuses, and non-transitory computer-readable medium described herein may further include operations, features, means, or instructions for receiving control signaling, from the base station, that indicates a sounding reference signal offset parameter associated with the second periodic cadence and including a second value that corresponds to the first value and transmitting the sounding reference signals based on the sounding reference signal offset parameter.

Some examples of the method, apparatuses, and non-transitory computer-readable medium described herein may further include operations, features, means, or instructions for determining one or more candidate slots for transmission of the sounding reference signals based on a subframe number, the sounding reference signal cadence parameter, the sounding reference signal offset parameter, or any combination thereof, selecting one or more of the one or more candidate slots, and transmitting the sounding reference signals in the one or more selected candidate slots.

Some examples of the method, apparatuses, and non-transitory computer-readable medium described herein may further include operations, features, means, or instructions for receiving control signaling, from the base station, that indicates a frequency hopping scheme based on the sounding reference signal cadence parameter, a system frame number, and a subframe number and transmitting the sounding reference signals based on the frequency hopping scheme.

A method for wireless communications at a UE is described. The method may include receiving, from a base station, a downlink control information message scheduling periodic downlink bursts of multimedia data traffic, receiving, from the base station, first control signaling that indicates that the UE is to transmit a sounding reference signal at a time that is associated with a beginning of at least one of the periodic downlink bursts of multimedia data traffic, and transmitting, to the base station, the sounding reference signal based on the first control signaling.

An apparatus for wireless communications at a UE is described. The apparatus may include a processor, memory coupled with the processor, and instructions stored in the memory. The instructions may be executable by the processor to cause the apparatus to receive, from a base station, a downlink control information message scheduling periodic downlink bursts of multimedia data traffic, receive, from the base station, first control signaling that indicates that the UE is to transmit a sounding reference signal at a time that is associated with a beginning of at least one of the periodic downlink bursts of multimedia data traffic, and transmit, to the base station, the sounding reference signal based on the first control signaling.

Another apparatus for wireless communications at a UE is described. The apparatus may include means for receiving, from a base station, a downlink control information message scheduling periodic downlink bursts of multimedia data traffic, means for receiving, from the base station, first control signaling that indicates that the UE is to transmit a sounding reference signal at a time that is associated with a beginning of at least one of the periodic downlink bursts of multimedia data traffic, and means for transmitting, to the base station, the sounding reference signal based on the first control signaling.

A non-transitory computer-readable medium storing code for wireless communications at a UE is described. The code may include instructions executable by a processor to receive, from a base station, a downlink control information message scheduling periodic downlink bursts of multimedia data traffic, receive, from the base station, first control signaling that indicates that the UE is to transmit a sounding reference signal at a time that is associated with a beginning of at least one of the periodic downlink bursts of multimedia data traffic, and transmit, to the base station, the sounding reference signal based on the first control signaling.

In some examples of the method, apparatuses, and non-transitory computer-readable medium described herein, receiving the first control signaling may include operations, features, means, or instructions for receiving the first control signaling, from the base station, that indicates that the UE may be to transmit the sounding reference signal in a slot that may be a number of slots before a beginning of the periodic downlink bursts, the number being greater than a number of slots corresponding to a time period utilized by the base station to process the sounding reference signal; where the sounding reference signal may be transmitted in the slot that may be the number of slots before the beginning of the periodic downlink bursts.

In some examples of the method, apparatuses, and non-transitory computer-readable medium described herein, receiving the first control signaling may include operations, features, means, or instructions for receiving the first control signaling, from the base station, that indicates that the UE may be to transmit the sounding reference signal based on a period of the periodic downlink bursts and further indicates an offset corresponding with the number of slots before the beginning of the periodic downlink bursts, where the sounding reference signal may be transmitted based on the period of the periodic downlink bursts and the offset.

In some examples of the method, apparatuses, and non-transitory computer-readable medium described herein, receiving the first control signaling may include operations, features, means, or instructions for receiving the first control signaling, from the base station, that indicates an uplink shared channel time domain allocation parameter, where the number of slots before the beginning of the periodic downlink bursts may be based on the uplink shared channel time domain allocation parameter.

In some examples of the method, apparatuses, and non-transitory computer-readable medium described herein, receiving the first control signaling may include operations, features, means, or instructions for receiving the first control signaling, from the base station, that indicates that the UE may be to transmit the sounding reference signal in a slot associated with an active period of a discontinuous reception scheme, where the sounding reference signal may be transmitted in the slot associated with the active period.

In some examples of the method, apparatuses, and non-transitory computer-readable medium described herein, receiving the first control signaling may include operations, features, means, or instructions for receiving the first control signaling, from the base station, that indicates an uplink shared channel time domain allocation parameter and further indicates that the active period of the discontinuous reception scheme may be scheduled to begin before the slot in which the sounding reference signal may be to be transmitted, where the number of slots before the beginning of the periodic downlink bursts may be based on the uplink shared channel time domain allocation parameter.

Some examples of the method, apparatuses, and non-transitory computer-readable medium described herein may further include operations, features, means, or instructions for receiving second control signaling, from the base station, that indicates that the UE may be to transmit the sounding reference signal at an earliest-available slot following a slot in which the periodic downlink bursts begin and transmitting the sounding reference signal in the earliest-available slot following the slot in which the periodic downlink bursts begin.

Some examples of the method, apparatuses, and non-transitory computer-readable medium described herein may further include operations, features, means, or instructions for receiving the first control signaling, from the base station, that indicates that the UE may be to transmit the sounding reference signal based on a period of the periodic downlink bursts and an offset that matches the earliest-available slot following the slot in which the periodic downlink bursts begin and where transmitting the sounding reference signal in the earliest-available slot following the slot in which the periodic downlink bursts begin includes transmitting the sounding reference signal based on the period of the periodic downlink bursts and the offset.

Some examples of the method, apparatuses, and non-transitory computer-readable medium described herein may further include operations, features, means, or instructions for receiving the first control signaling and the second control signaling using a first communication scheme including one or more first parameters including one or more margins of error that may be greater than one or more margins of error included in a second communication scheme to be used after transmitting the sounding reference signal.

DETAILED DESCRIPTION

Figure 1:
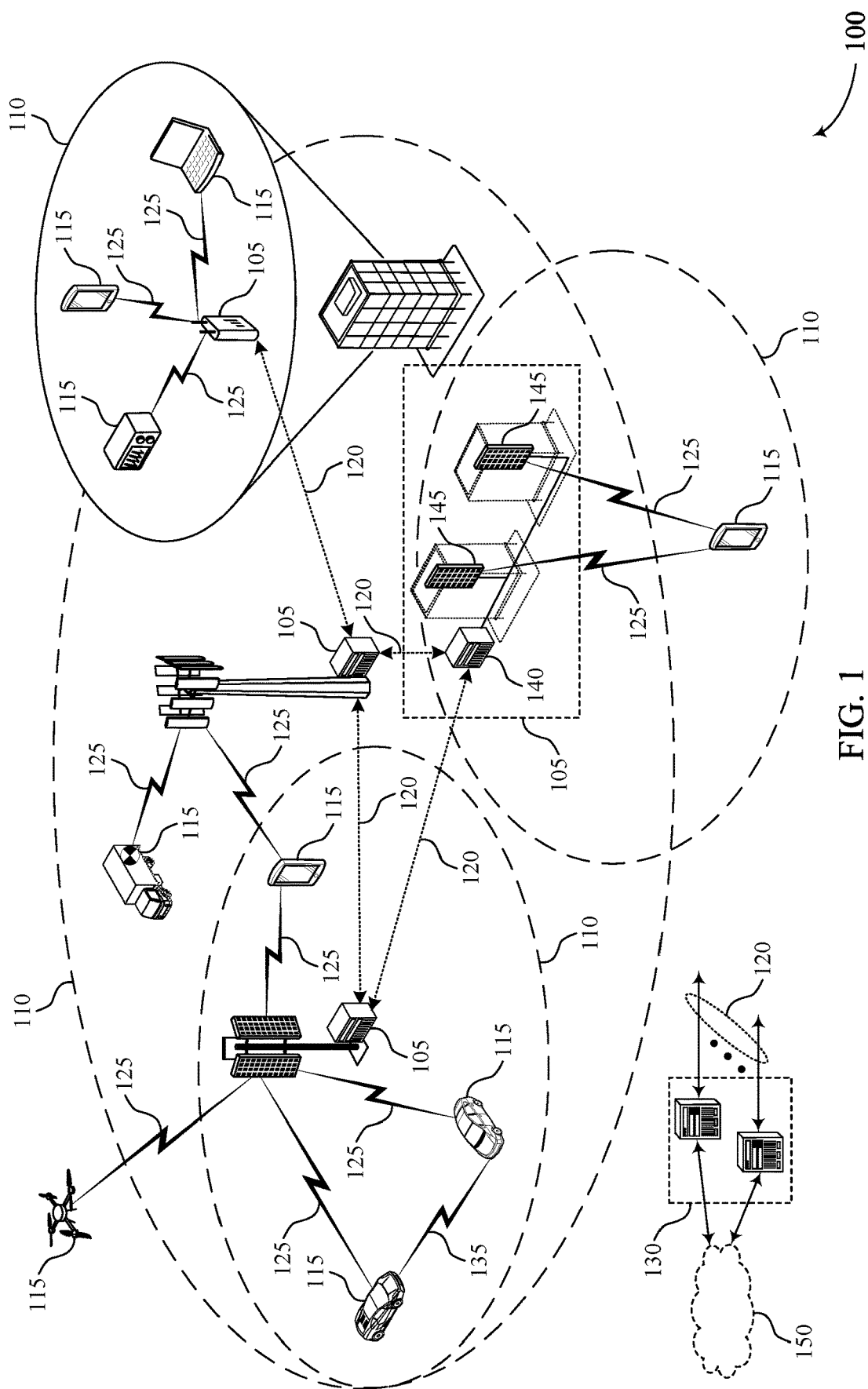
FIG. 1 illustrates an example of a wireless communications system that supports sounding reference signal coordination for periodic traffic in accordance with aspects of the present disclosure.

In the course of wireless communications, a user equipment (UE) may receive periodic multimedia traffic, such as extended-reality (XR) traffic or cloud gaming traffic. In such cases, the UE may receive such periodic traffic at regular periods, and such regular periods may line up with commonly used frame rates or display rates that may be measured in transmissions per second or Hertz (e.g., 46 Hz, 48 Hz, 60 Hz, 90 Hz, 120 Hz, or other rates). Further, the UE may transmit sounding reference signals (SRSs) to the base station so that the base station may measure the uplink channel quality and make determinations based on that channel quality accordingly (e.g., adjust scheduling, configurations, transmission parameters, or other parameters). Because channel conditions may change over time, SRS transmissions may be more useful or updated when the SRS transmission takes place close in time to associated downlink transmissions (e.g., the XR or cloud gaming traffic). However, the cadence of periodic traffic such as the XR or cloud gaming traffic may not align with the cadence of SRS transmissions. For example, the cadence of XR traffic may drift relative to the cadence of SRS transmissions since the two cadences may not be exactly the same. Such drift or misalignment may impact the effectiveness of measurements of the SRSs, since the SRSs transmitted by the UE may be separated in time from the periodic XR traffic.

To reduce or eliminate misalignment between periodic multimedia traffic and SRS transmissions, a base station may direct a UE to align the SRS transmissions with the periodic multimedia traffic. The base station may transmit control signaling to the UE that may direct the UE to transmit SRS based on an outer SRS cycle and an inner SRS cycle. The outer SRS cycle may be a multiple of the cadence of the multimedia traffic. The inner SRS cycle may include various sub-cycles which may include one or more non-uniform sub-cycles to better align SRS transmissions with the periodic multimedia traffic. The base station may transmit control signaling to the UE that may include values for various parameters to assist in defining such an SRS transmission scheme, including a cadence parameter, a slot offset parameter, or both. The base station may further transmit control signaling instructing the UE to engage in frequency hopping that may be based on one or more such parameters. In this way, the SRS transmissions may be better aligned with the periodic multimedia traffic, and communication quality may be improved.

Additionally or alternatively, the base station may transmit control signaling instructing the UE to transmit the SRS in alignment (e.g., within a threshold) of the beginning of an XR burst. The UE may transmit the SRS either before or after the beginning of an XR burst. Further, the base station may transmit control signaling to the UE to adjust the transmission of the SRS transmissions to align with the periodicity of the periodic multimedia traffic, and may further adjust such transmissions based on additional parameters, including an uplink shared channel time domain allocation parameter (e.g., a k2 parameter), an active period associated with a discontinuous reception (DRX) scheme, or other parameters. In this way, the SRS transmissions may be better aligned with the periodic multimedia traffic, and communication quality may be improved.

Aspects of the disclosure are initially described in the context of wireless communications systems. Aspects of the disclosure of then illustrated by an example system, example SRS transmissions schemes, and an example process flow. Aspects of the disclosure are further illustrated by and described with reference to apparatus diagrams, system diagrams, and flowcharts that relate to sounding reference signal coordination for periodic traffic.

FIG. 1 illustrates an example of a wireless communications system 100 that supports sounding reference signal coordination for periodic traffic in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the course of wireless communications, the UE 115 may be used to receive periodic downlink traffic (e.g., bursts of multimedia traffic, extended reality traffic, virtual reality traffic, gaming traffic, video traffic, audio traffic, other periodic traffic, or any combination thereof). In some examples, a transmitting device (e.g., the base station 105) may utilize channel measurements to adjust one or more transmission parameters for better transmission of such traffic, and the UE 115 may transmit one or more SRSs associated with such channel measurements. However, in some examples, the SRSs may be more useful if they are transmitted close to a burst of traffic (e.g., the channel measurement made based on an SRS close to the traffic burst may be more up-to-date or may more accurately reflect channel conditions at a point in time). As such, the UE may receive control signaling (e.g., DCI) that may schedule the traffic as well as control signaling that may instruct the UE 115 to transmit one or more SRSs to be used in connection with the traffic bursts. For example, if the downlink traffic is transmitted with a regular period, the timing of one or more SRS transmissions may be adjusted so that the UE 115 may transmit the SRSs close enough to the periodic downlink traffic such that the SRSs may be more accurate (e.g., within a threshold distance in time from the downlink traffic, or using one or more periods that may better align the SRSs with the downlink traffic). In this way, the UE 115 may transmit the SRSs so that the receiving device (e.g., the base station 105) may better reflect actual channel conditions, and the quality of wireless communications may be improved.

Figure 2:
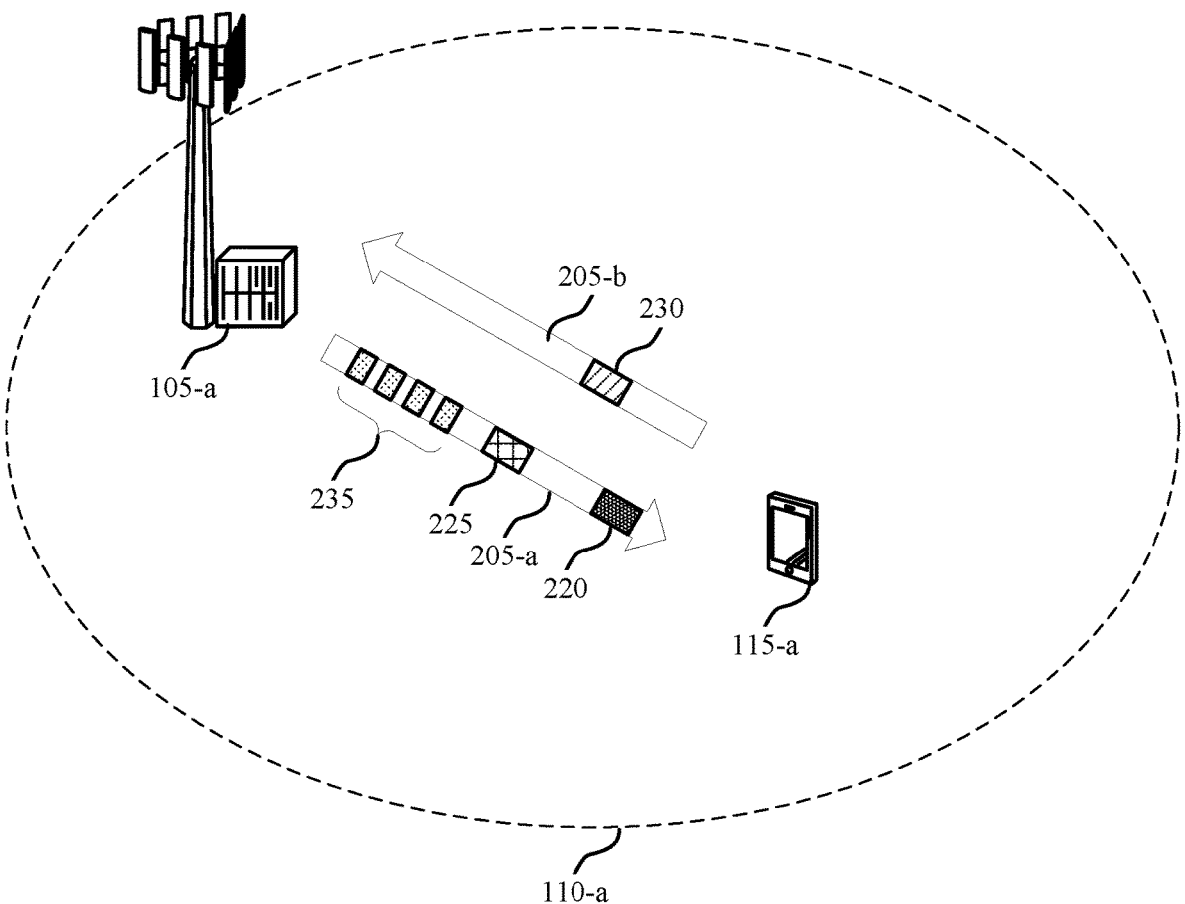
FIG. 2 illustrates an example of a system that supports sounding reference signal (SRS) coordination for periodic traffic in accordance with aspects of the present disclosure.

FIG. 2 illustrates an example of a system 200 that supports sounding reference signal coordination for periodic traffic in accordance with aspects of the present disclosure. The wireless communications system 200 may include a base station 105-a that may be an example of the base station 105 discussed in relation to FIG. 1. The wireless communications system 200 may include UE 115-a that may be an example of UE 115 discussed in relation to FIG. 1. In some examples, the base station 105-a and the UE 115 a may be located in a geographic coverage area 110-a. The base station 105-a and UE 115-a may communicate via one or more downlink communication links 205-a and one or more uplink communication links 205-b. In the course of communications, the base station 105-a may transmit to the UE 115-a one or more of DCI 220, control signaling 225, multimedia data traffic 235, or any combination thereof, and the UE 115-a may transmit one or more SRSs 230 to the base station 105-a.

In the course of communications, the UE 115-a and the base station 105-a may communicate in association with a variety of use cases, including use cases such as extended reality, cloud gaming, multimedia streaming, or other use cases. Such cases may involve or be associated with periodic traffic (e.g., multimedia data traffic 235). For example, in a virtual reality use case, the base station 105-a may transmit downlink virtual reality traffic at a regular period (e.g., every 11.1 ms) and each instance of such traffic may last for a duration of time (e.g., approximately 4 ms). To improve user experience and power savings, uplink traffic may be aligned (e.g., within a threshold) to the downlink traffic, and such uplink traffic may include uplink SRS traffic (e.g., SRS 230).

In some examples, the base station 105-a may measure the SRS 230 transmitted by the UEs for at least two purposes, including for estimation of the quality of the radio link in uplink (and possibly in downlink, which may include the use or consideration of downlink-uplink reciprocity), as well as for beam management (e.g., where the base station 105-a may choose one or more beams for communicating with the UE 115-a).

In the time domain, SRS transmissions (e.g., SRS 230) may be configured by control signaling (e.g., control signaling 225, which may include or be RRC signaling). Such control signaling 225 may configure transmission of the SRS 230 in various ways, including with periodic, semi-persistent, and aperiodic schemes. In periodic SRS transmission, the UE 115-a may transmit SRS 230 periodically. In semi-persistent SRS transmission, the UE 115-a may transmit SRS 230 periodically, but the UE may withhold or not transmit SRS 230 until reception of an indication (e.g., from the base station 105-a) to do so. For example, the UE 115-a may transmit SRS 230 based on reception of control signaling (e.g., reception of a MAC-CE indication, such as a SP SRS Activation/Deactivation MAC-CE). In aperiodic SRS transmission, the UE 115-a transmits SRS 230 upon reception of or based on an indication (e.g., a DCI, such as the DCI 220). In some examples, such a transmission may be a "one-shot" transmission triggered by the reception of the indication, and the UE 115-a may not transmit the SRS 230 periodically.

However, if the SRS 230 is received far away from the multimedia data traffic 235 (e.g., outside of a threshold or range around one or more elements of the multimedia data traffic 235), communications quality may suffer. For example, measurements based on the SRS 230 may be outdated. For example, if the UE 115-a transmits SRS 230 far before the start of a burst of the multimedia data traffic 235, the latest measurements that the base station 105-a obtains may be outdated, and system performance (e.g., beam management, scheduling decisions, or other system operations) may be degraded. Further, one or more transmissions may be missed by the UE 115-a, the base station 105-a, or both.

For example, if the UE 115-a is configured with discontinuous reception (DRX), the UE 115-a may not transmit SRS outside of an "active" time associated with the DRX scheme. As such, if the UE 115-a is configured with SRS 230 transmission in-between two bursts, the UE 115-a may not transmit SRS outside the "active" time. As such, the base station 105-a may not obtain one or more measurements, and system performance (e.g., beam management, scheduling decisions, or other system operations) may be degraded.

Further, in some situations, UE 115-a may be configured with an SRS 230 transmission scheme that may configure one or more candidate slots for periodic or semi-persistent SRS 230 transmission that may satisfy an equation based on one or more factors (e.g., a number of slots per frame, a system frame number, a slot number within a frame, an SRS period, an offset inside the SRS period) that may be represented or configured by one or more parameters (e.g., periodicityAndOffset-p or periodicityAndOffset-sp, which may be configured via control signaling such as RRC, and may be further configured by one or more information elements, such as the SRS-Resource information element). However, such a periodicity configuration may suffer from mismatch problems, in that the SRS transmissions may not align or may not occur within sufficient proximity to the multimedia data traffic 235.

Therefore, to maintain or improve system performance, the system may align (e.g., within a threshold) one or more SRSs 230 with a periodicity of the multimedia data traffic 235. In some examples, the SRS 230 transmitted by the UE 115-a may be configured to be aligned with (or near, such as within a threshold distance from) an "active" time of the DRX (e.g., an On_Duration period).

In some examples, the UE 115-a may receive DCI 220 from the base station 105-a (or from another transmitting device). The DCI 220 may include information that may schedule the transmission of the multimedia data traffic 235 from the base station 105-a to the UE 115-a. Such multimedia data traffic 235 may include periodic traffic (e.g., traffic that may be transmitted by the base station 105-a at regular intervals, such as audiovisual, gaming, multimedia, or other types of traffic that may use regular intervals of transmission). Such periodic traffic may be transmitted by the base station 105-a (or other transmitting device) at intervals that may align with (e.g., within a threshold) or be associated with multimedia display or playback rates (e.g., 46 Hz, 48 Hz, 60 Hz, 90 Hz, 120 Hz, or other rates). In some examples, regular intervals of transmission associated with the multimedia data traffic 235 may be referred to as a cadence.

In some examples, the UE 115-a may receive control signaling 225 (e.g., RRC signaling, DCI, other control signaling, or any combination thereof) that may indicate that the UE 115-a is to transmit one or more SRSs 230 at regular intervals (e.g., a periodicity or cadence). For example, the UE 115-a may receive such control signaling that may indicate that the UE 115-a is to transmit SRSs 230 according to a cadence that may be a multiple of the cadence of the multimedia data traffic 235. Such a multiple could be a multiple greater than one (e.g., one SRS 230 for multiple bursts of the multimedia data traffic 235), a multiple less than one (e.g., multiple SRSs 230 for a single burst of the multimedia data traffic 235), or a multiple of one (e.g., one or more SRSs 230 may be aligned with the multimedia data traffic 235, optionally within a threshold).

Additionally or alternatively, the control signaling 225 may indicate to the UE 115-a that the UE 115-a is to transmit an SRS 230 at a time associated with a beginning of the multimedia data traffic 235. For example, the control signaling 225 may indicate that the UE 115-a is to transmit the SRS 230 before the beginning of the multimedia data traffic 235 or after the beginning of the multimedia data traffic 235. In some examples, the UE 115-a may transmit the SRS 230 in a slot that allows time for the base station 105-a to process the SRS 230 before the base station 105-a transmits the multimedia data traffic 235. Additionally or alternatively, the UE 115-a may transmit the SRS 230 in an earliest available slot that falls later in time after the beginning of the multimedia data traffic 235.

Figure 3:
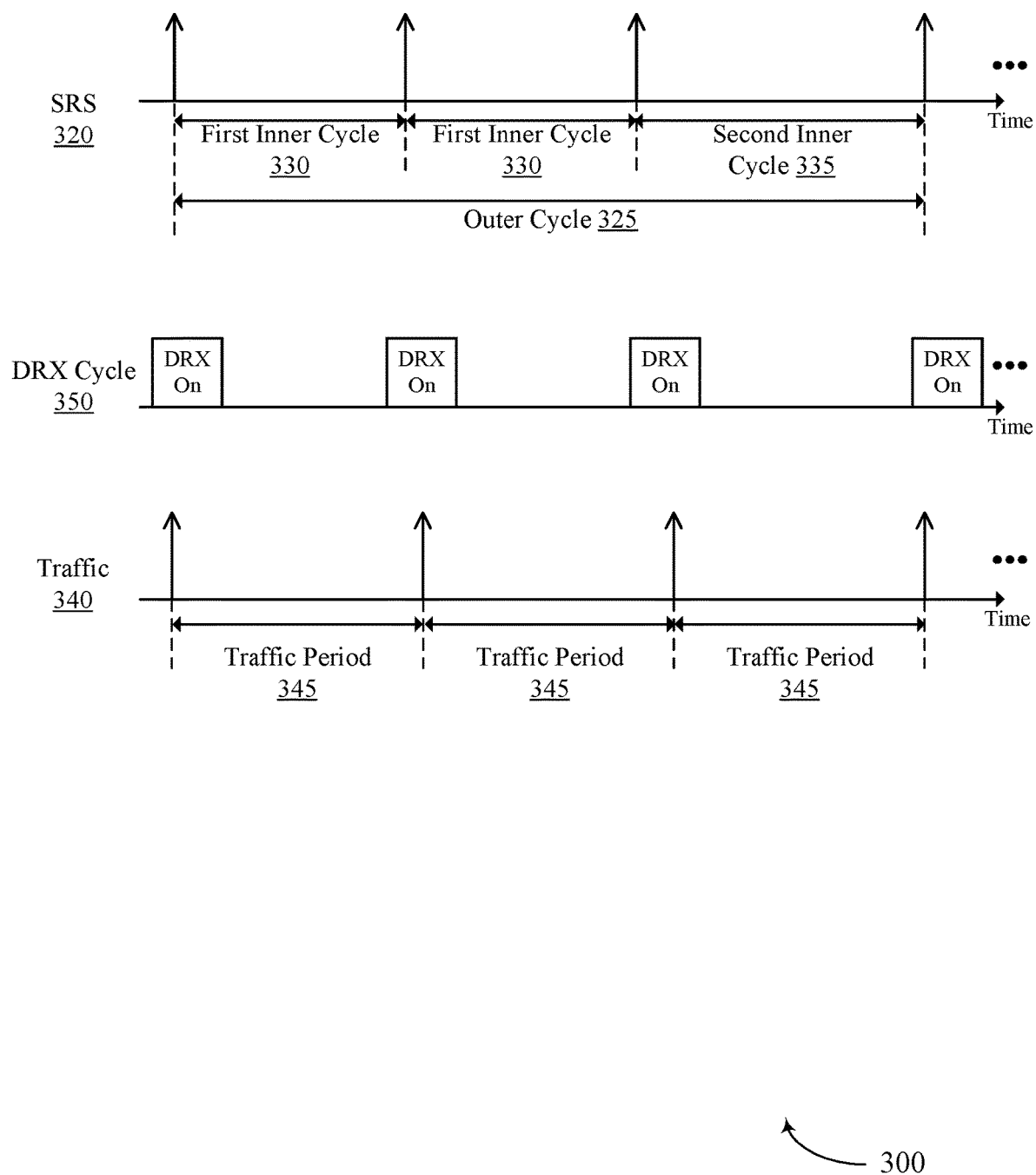
FIG. 3 illustrates an example of an SRS transmission scheme that supports sounding reference signal coordination for periodic traffic in accordance with aspects of the present disclosure.

FIG. 3 illustrates an example of an SRS transmission scheme 300 that supports sounding reference signal coordination for periodic traffic in accordance with aspects of the present disclosure. In the SRS transmission scheme 300, a UE may transmit SRS 320 using a two-level SRS cycle, which may include an outer cycle 325 (which may be considered to be an "anchor" cycle upon which one or more other cycles may be based), a first inner cycle 330, and a second inner cycle 335. In some examples, the outer cycle 325 may support uniform transmission of the SRSs 320 (e.g., transmission of the SRS 320 at regular intervals). The UE may also employ a number of sub-cycles, one or more of which may be non-uniform. For example, the UE may use one or more of the first inner cycle 330, the second inner cycle 335, or both, within a period of the outer cycle 325. Various combinations of the first inner cycle 330 and the second inner cycle 335 may be used. In some examples, the start of a first inner cycle 330 may be aligned (e.g., within a threshold) to the start of the outer cycle 325.

For examples, the outer cycle 325 may be configured to be a number of slots (e.g., 50 slots, corresponding to a time period of 25 ms). Each of the two first inner cycles 330 may be configured to be a number of slots (e.g., 16 slots), and the second inner cycle 335 may be a non-uniform cycle (e.g., may be a different length or duration than the first inner cycles 330, such as 18 slots). Thus, the two first inner cycles 330 and the second inner cycle 335 may collectively correspond to the length or duration of the outer cycle 325. In this way, the UE may employ a set of inner cycles that may include one or more non-uniform inner cycles, and the transitions between one or more inner cycles may be aligned (e.g., within a threshold) to the sub-cycles for the "active" periods of the DRX cycle 350. Further, the transitions between one or more inner cycles may be aligned (e.g., within a threshold) with the periodic traffic 340 that is transmitted according to the traffic period 345. In this way, though the transmission of the SRS 320 transmissions may or may not exactly align with the transmission of the traffic 340, the SRS 320 transmissions.

In some examples, values for the length of the outer cycle 325 may be implemented. For example, the base station may transmit control signaling to the UE indicating that the UE is to use an outer cycle 325 of a length that may align with the traffic period 345. A single outer cycle 325 may correspond to multiple traffic periods 345, or may correspond to a single traffic period 345. For example, if a subcarrier spacing is 30 kHz, the outer cycle 325 may be of a length of 200, 125, 100, 200, or 50 slots, and each of those lengths may be associated with a traffic period 345 of 30, 48, 60, 90, or 120 Hz, respectively. Other combinations of outer cycle 325 lengths and corresponding traffic periods 345 are possible, and are not limited to the particular examples discussed herein.

In some examples, a calculation for an SRS counter parameter or variable (e.g., $n_{SRS}$ or another parameter or variable associated with a frequency hopping scheme) may be employed. Such an SRS counter parameter or variable may be employed in a frequency hopping scheme, and an associated indication of the parameter or variable may be transmitted from the base station to the UE. For example, such an SRS counter parameter may be determined, calculated, received, or otherwise obtained (e.g., by the UE or the base station) based on a counter corresponding to an outer cycle 325, a number of inner cycles in an outer cycle 325, an index of an inner cycle in the outer cycle 325, or any combination thereof. For example, such a calculation may be expressed by $n_{SRS} = (n_{innerCycles} * n_{SRS\_outer}) + n_{SRS\_inner}$.

In some examples, one or more additional parameters may be defined, transmitted, calculated, determined, identified, selected, or otherwise obtained (e.g., to support SRS transmission as described herein).

For example, a parameter or variable may define an SRS period (e.g., the outer cycle 325, the first inner cycle 330, the second inner cycle 335, another SRS period, or any combination thereof) that may be expressed in values of Hz. Such a parameter or variable may be designated as "srsCadence." Such a parameter or variable may bear values such as 45, 60, 90, or 120 Hz, or other values, as appropriate. For examples, such a parameter or variable may bear a value that may corresponding with a traffic period 345 of traffic 340 (e.g., multimedia traffic, such as virtual reality traffic or cloud gaming traffic). Such a parameter or variable may be included in one or more information elements of control signaling (e.g., RRC information elements, such as SRS-Resource), and may be signaled by a base station to a UE, for example.

Another parameter or variable may define an SRS offset that may be expressed by a number of slots, an amount of time, or another metric. Such a parameter or variable may be designated as "srsSlotOffset." In some examples, such a parameter or value may accept all possible values that correspond to a value of the proposed srsCadence parameter or variable. For example, if the srsCadence parameter bears a value of 120 Hz, then (assuming a subcarrier spacing of 30 kHz) the srsSlotOffset parameter may then bear a value of anywhere from 0 to 17 slots. Such a parameter or variable may be included in one or more information elements of control signaling (e.g., RRC information elements, such as SRS-Resource), and may be signaled by a base station to a UE, for example.

In some examples, a determination, identification, selection, or acquisition of one or more candidate slots for SRS transmissions may be performed. In some examples, such acquisition may be performed based on a system frame number (SFN), a subframe number, an SRS cadence parameter (e.g., srsCadence, as described herein), an SRS offset parameter (e.g., srsSlotOffset, as described herein), or any combination thereof. For example, such a determination, identification, selection, or acquisition may be performed in accordance with a formula, algorithm, or sequence of operations, such as the following: If ceil(n*srsCadence/1000)+1=ceil((n+1)*srsCadence/1000), where n=((SFN*10)+subframe number) then a slot that is a number of slots after the start of subframe n (e.g., defined by a parameter such as srsSlotOffset, as described herein) may be designated, identified, selected, or otherwise acquired as a candidate slot for transmission of SRS 320.

In some examples, a sequence of operations may be employed to determine, identify, select, or acquire an SRS counter parameter or variable (e.g., $n_{SRS}$ or another parameter or variable associated with a frequency hopping scheme). For example, such an SRS counter parameter may be determined, calculated, received, or otherwise obtained (e.g., by the UE or the base station) based on a subframe number, an SRS period parameter (e.g., srsCadence, as described herein). For example, if n=((SFN*10)+subframe number) of a subframe that may satisfy ceil(n*srsCadence/1000)+1=ceil((n+1)*srsCadence/11000), then a calculation of such an SRS counter parameter (e.g., $n_{SRS}$ or another parameter) may be based on ceil(n*srsCadence/1000). For example, one example formula for such a parameter may be $$n_{SRS} = \text{ceil}\left(n * \frac{srsCadence}{1000}\right) * \left(\frac{N_{symb}^{SRS}}{R}\right) + \text{floor}\left(\frac{l'}{R}\right).$$

In some examples, calculations, determinations, identifications, or acquisitions may be based on the SFN, whose range may be 0 to 1023. As such, in some instances, the SFN may "wraparound" from 1023 to 0. In some such instances, a calculation associated with the SFN wraparound may result in a result that is not consistent with a result obtained that is not associated with the SFN wraparound. In some instances, a new counter (e.g., designated as SFN_M) may be employed for one or more calculations associated with SRS transmissions. For example, a calculation may include ((SFN_M*10)+sub frame number). Additionally or alternatively, a formula for an SRS cycle may be defined that may sequentially search for the next SRS transmission instance. For example, if an SRS outer cycle 325 is to include two 16 slot first inner cycles 330 and a single 18 slot second inner cycle 335, such an approach may sequentially iterate this pattern (e.g., 16, 16, 18) to locate one or more candidate slots for an SRS transmission, regardless of where an SFN wraparound may occur. Additionally or alternatively, an explicit command or indication (e.g., a MAC-CE) may be transmitted associated with the SFN wraparound to adjust a period that may include the SFN wraparound therein to obtain a result consistent with other period calculations.

Figure 4:
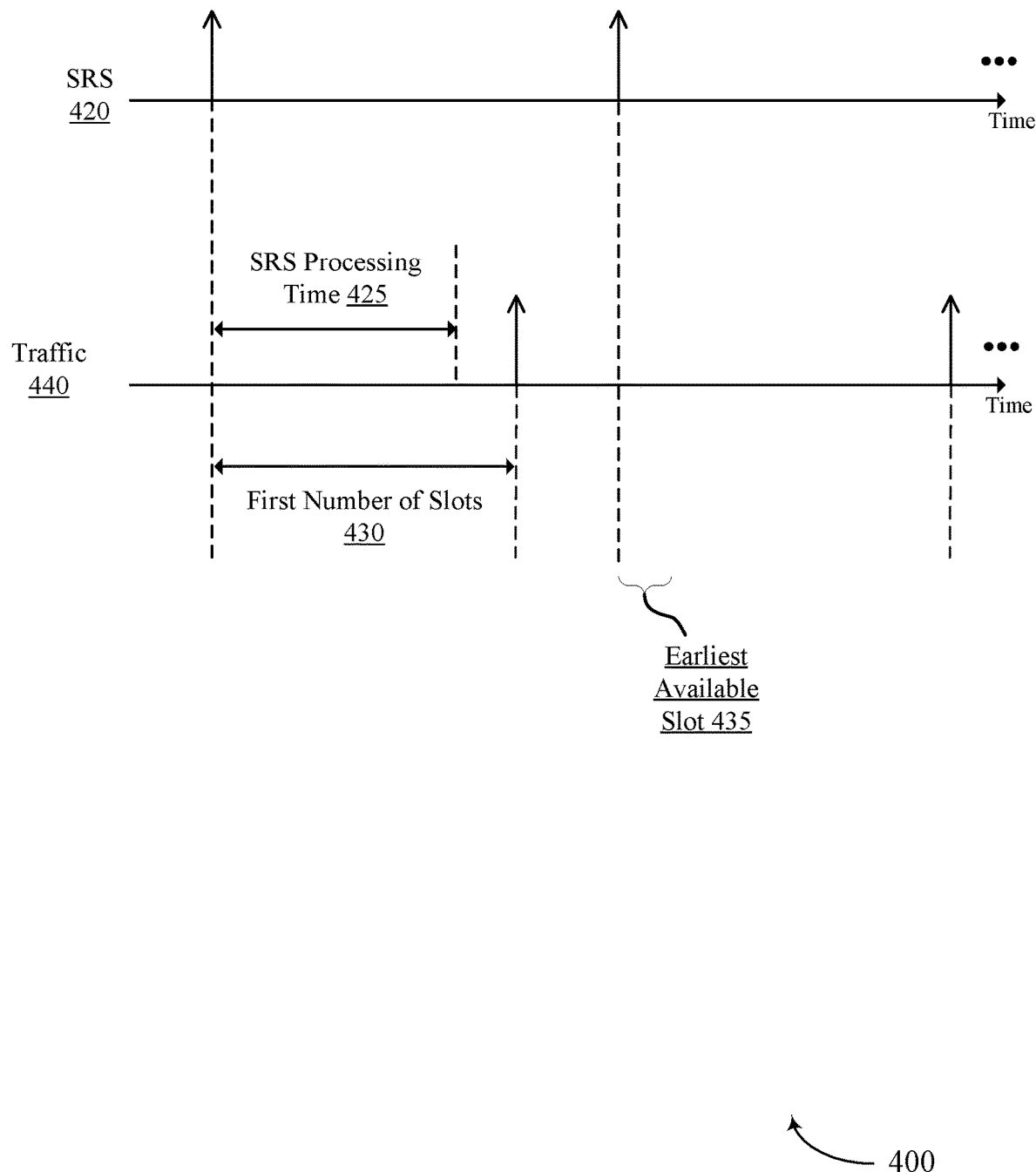
FIG. 4 illustrates an example of an SRS transmission scheme that supports sounding reference signal coordination for periodic traffic in accordance with aspects of the present disclosure.

FIG. 4 illustrates an example of an SRS transmission scheme 400 that supports sounding reference signal coordination for periodic traffic in accordance with aspects of the present disclosure. In the SRS transmission scheme 400, a UE may transmit SRS 420 that may be associated with the beginning of a downlink burst of traffic 440 (e.g., aligned within a threshold, before, or after the beginning of the downlink burst). In this way, the base station may acquire measurements associated with the SRS 420 transmissions at a time near (e.g., within a threshold) of scheduling downlink transmissions, such as the traffic 440. In some examples in which the UE may be configured with DRX, an "active" time (e.g., the On_Duration) may be adjusted to start earlier (e.g., earlier than the beginning of a traffic 440 burst).

In some examples, the base station may request that the UE transmit the SRS 420 a first number of slots 430 before the traffic 440 burst. Such an approach may allow the UE to transmit SRS to the base station at a time in which the base station may obtain up-to-date measurements, thereby increasing communications performance. In some examples, the first number of slots 430 may be based on (e.g., may be greater than or equal to) an SRS processing time 425. The SRS processing time 425 may be a period of time that the base station may use to process a received SRS 420, perform one or more calculations, obtain one or more measurements, or perform one or more operations associated with the SRS 420. The base station may transmit such a request to the UE using one or more methods, including transmitting the request via control signaling (e.g., RRC signaling, DCI signaling, MAC-CE signaling, or other signaling).

For example, the base station may transmit control signaling to the UE configuring the UE to begin an SRS transmission period as close as possible to a period of the traffic 440. Additionally or alternatively, the base station may further configure an SRS offset (e.g., corresponding to or associated with the first number of slots 430) such that an SRS 420 transmission takes places a number of slots before the start of a traffic 440 burst.

In some examples involving periodic or semi-persistent SRS transmissions, the base station may configure the UE with DRX, and the base station may configure the start of an "active" period (e.g., an On_Duration period) such that the slot in which the UE is configured to transmit the SRS 420 may fall within the "active" period. In some examples involving aperiodic SRS, the base station may transmit signaling (e.g., DCI) that may act as a trigger for the UE to transmit the SRS 420. Such a trigger may indicate to the UE that the UE is to transmit the SRS 420 a second number of slots before the start of the traffic 440 burst. In some examples, such a second number of slots may include or be based on the first number of slots 430 as described herein, an uplink shared channel time domain allocation parameter (e.g., a k2 parameter), or both. Further, the base station may configure the UE with DRX, and the base station may configure the start of an "active" period (e.g., an On_Duration period) such that the "active" period may begin before the second number of slots (e.g., which may include or be based on the first number of slots 430 as described herein, an uplink shared channel time domain allocation parameter (e.g., a k2 parameter), or both) before the start of the traffic 440 burst.

Additionally or alternatively, the base station may configure the UE to transmit the SRS 420 after the beginning of the traffic 440 burst. Such an approach may avoid the UE exiting sleep for the sole purpose of transmitting SRS, and power consumption is improved. In some examples, the base station may begin scheduling transmissions (e.g., traffic 440 bursts) before receiving SRS measurements, which may reduce performance. A trade-off between power consumption and performance may be present, and the base station, the UE, or both may make determinations, selections, or calculations to adjust such a trade-off, and select an approach based on one or more factors.

In some examples, the base station may request that the UE transmit the SRS 420 at the earliest available slot 435 after the beginning of the traffic 440 burst. For examples, for periodic and semi-persistent SRS transmissions, the base station may configure the UE to transmit SRS according to an SRS period that may begin as soon as possible (e.g., at the earliest available slot 435), and may configure an SRS offset that may correspond to or be associated with the earliest available slots following the start of the traffic 440 burst.

In some examples involving aperiodic SRS, the base station may transmit signaling (e.g., DCI) that may act as a trigger for the UE to transmit the SRS 420. Such a trigger may indicate to the UE that the UE is to transmit the SRS 420 in the earliest available slot 435 following the beginning of a traffic 440 burst. In some examples, at or near (e.g., within a threshold) a time at which a new traffic 440 burst begins, the base station may employ a communication scheme that may include one or more first parameters with one or more margins of error that are greater than one or more margins of error of a second communication scheme to be used after transmitting the sounding reference signal. In other words, the base station may employ a more "robust" communication scheme (e.g., a scheme that may work in a wider variety of situations) until the UE has an opportunity to transmit the SRS 420 at the earliest available slot 435 as described herein, at which time the base station may employ a communication scheme that may take advantage of measurements made, selected, identified, or otherwise acquired based on the reception of the SRS 420 transmitted by the UE. For example, such a "robust" scheme may include a more conservative modulation coding scheme, wider transmission beams, or other parameters that may be adjusted to provide greater reliability in the absence of the SRS 420 transmitted by the UE.

Figure 5:
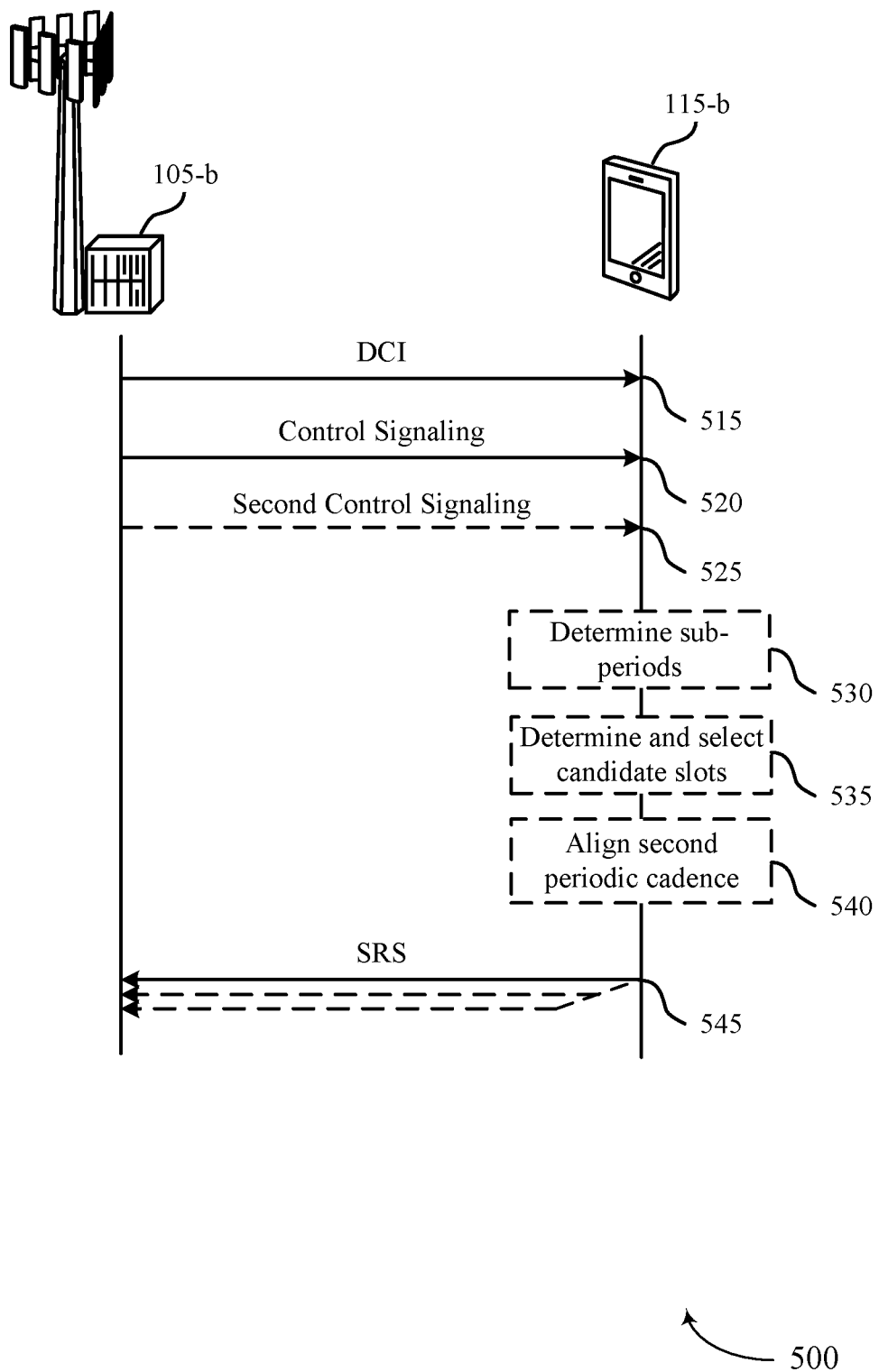
FIG. 5 illustrates an example of a process flow that supports sounding reference signal coordination for periodic traffic in accordance with aspects of the present disclosure.
Figure 8:
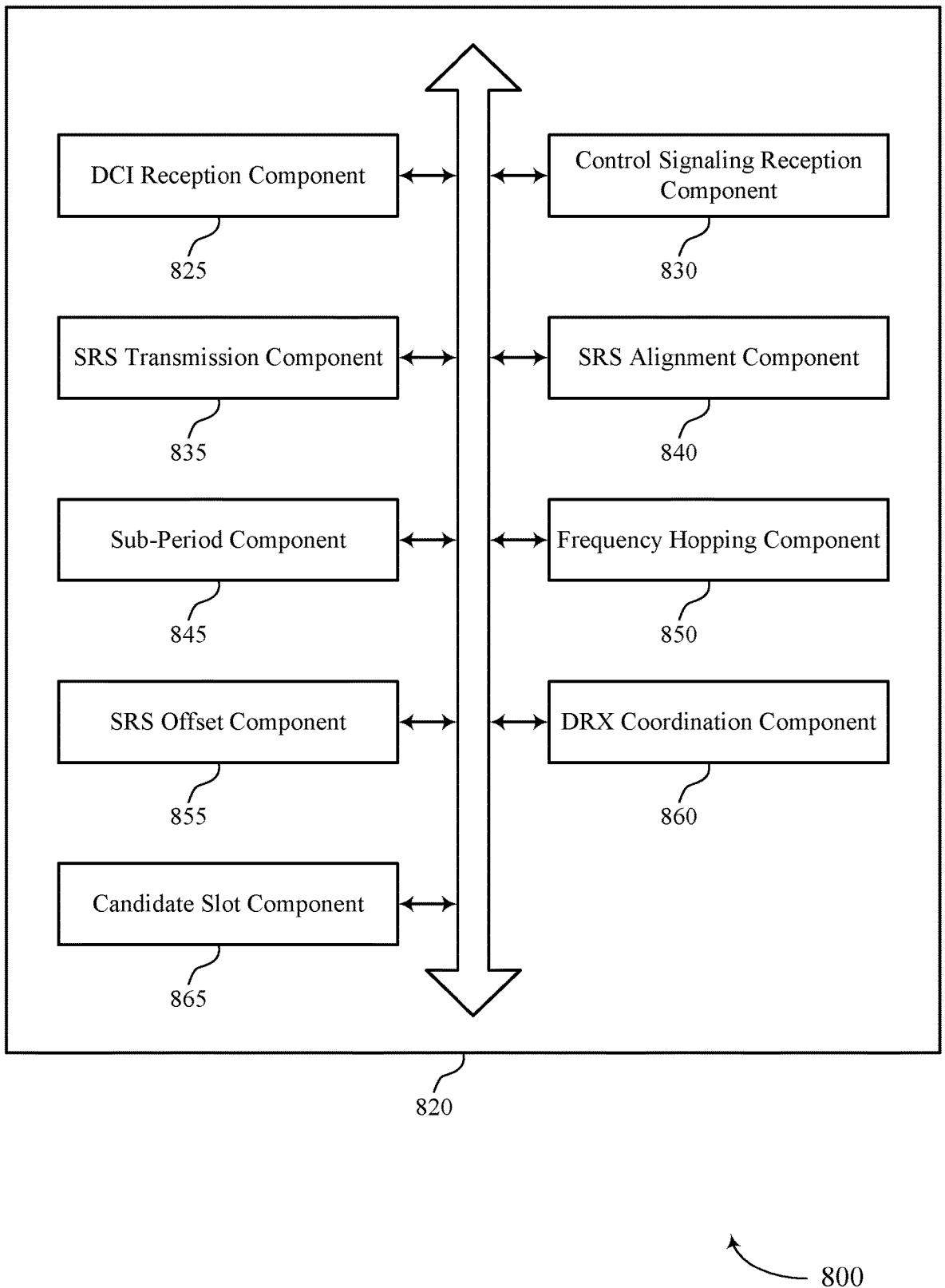
FIG. 8 shows a block diagram of a communications manager that supports sounding reference signal coordination for periodic traffic in accordance with aspects of the present disclosure.

FIG. 5 illustrates an example of a process flow 500 that supports sounding reference signal coordination for periodic traffic in accordance with aspects of the present disclosure. FIG. 8 illustrates an example of a process flow 500 for wireless communications systems in accordance with one or more aspects of the present disclosure. The process flow 500 may implement various aspects of the present disclosure described with reference to FIGS. 1-4. The process flow 500 may include a UE 115-*b* and a base station 105-*b*, which may be examples of UE 115 and base station 105 as described with reference to FIGS. 1-4.

In the following description of the process flow 500, the operations between the UE 115-*b* and the base station 105-*b* may be performed in different orders or at different times. Some operations may also be left out of the process flow 500, or other operations may be added. Although the UE 115-*b* and the base station 105-*b* are shown performing the operations of the process flow 500, some aspects of some operations may also be performed by the base station 105-*b*, the UE 115-*b*, one or more other wireless devices, or any combination thereof.

At 515, the UE 115-*b* may receive, from a base station, a downlink control information message scheduling periodic downlink bursts of multimedia data traffic, the periodic downlink bursts of multimedia data traffic having a first periodic cadence. Additionally or alternatively, the UE 115-*b* may receive, from a base station, a downlink control information message scheduling periodic downlink bursts of multimedia data traffic.

At 520, the UE 115-*b* may receive, from the base station, control signaling that indicates that the UE is to periodically transmit sounding reference signals to the base station in accordance with a second periodic cadence, and the second periodic cadence may be a multiple of the first periodic cadence. In some examples, the control signaling may further indicate a value for a sounding reference signal cadence parameter that defines the second periodic cadence. In some examples, the UE 115-*b* may receive control signaling, from the base station, that indicates a frequency hopping scheme based on a first counter corresponding to the second periodic cadence, a number of sub-periods contained within the second periodic cadence, and a sub-period index that identifies a sub-period contained within the second periodic cadence. In some examples, the UE 115-*b* may receive control signaling, from the base station, that indicates a sounding reference signal cadence parameter associated with the second periodic cadence and including a first value measured in hertz that defines the second periodic cadence. In some examples, the UE 115-*b* may receive control signaling, from the base station, that indicates a sounding reference signal offset parameter associated with the second periodic cadence and including a second value that corresponds to the first value. In some examples, the UE 115-*b* may receive control signaling, from the base station, that indicates a frequency hopping scheme based on the sounding reference signal cadence parameter, a system frame number, and a subframe number.

Additionally or alternatively, the UE 115-*b* may receive, from the base station, first control signaling that indicates that the UE is to transmit a sounding reference signal at a time that is associated with a beginning of at least one of the periodic downlink bursts of multimedia data traffic. In some examples, the UE 115-*b* may receive the first control signaling, from the base station, that indicates that the UE is to transmit the sounding reference signal in a slot that is a number of slots before a beginning of the periodic downlink bursts, the number being greater than a number of slots corresponding to a time period utilized by the base station to process the sounding reference signal and the sounding reference signal may be transmitted in the slot that is the number of slots before the beginning of the periodic downlink bursts. In some examples, the UE 115-*b* may receive the first control signaling, from the base station, that indicates that the UE is to transmit the sounding reference signal based on a period of the periodic downlink bursts and further indicates an offset corresponding with the number of slots before the beginning of the periodic downlink bursts and the sounding reference signal may be transmitted based on the period of the periodic downlink bursts and the offset. In some examples, the UE 115-*b* may receive the first control signaling, from the base station, that indicates an uplink shared channel time domain allocation parameter and the number of slots before the beginning of the periodic downlink bursts may be based on the uplink shared channel time domain allocation parameter. In some examples, the UE 115-*b* may receive the first control signaling, from the base station, that indicates that the UE is to transmit the sounding reference signal in a slot associated with an active period of a discontinuous reception scheme and the sounding reference signal may be transmitted in the slot associated with the active period. In some examples, the UE 115-*b* may receive the first control signaling, from the base station, that indicates an uplink shared channel time domain allocation parameter and further indicates that the active period of the discontinuous reception scheme is scheduled to begin before the slot in which the sounding reference signal is to be transmitted and the number of slots before the beginning of the periodic downlink bursts may be based on the uplink shared channel time domain allocation parameter. In some examples, the UE 115-b may receive the first control signaling, from the base station, that indicates that the UE is to transmit the sounding reference signal based on a period of the periodic downlink bursts and an offset that matches the earliest-available slot following the slot in which the periodic downlink bursts begin. In some examples, the UE 115-b may receive the first control signaling and the second control signaling using a first communication scheme including one or more first parameters including one or more margins of error that are greater than one or more margins of error comprised in a second communication scheme to be used after transmitting the sounding reference signal.

At 525, the UE 115-b may receive second control signaling, from the base station, that indicates that the UE is to transmit the sounding reference signal at an earliest-available slot following a slot in which the periodic downlink bursts begin. In some examples, the UE 115-b may receive the second control signaling using a first communication scheme including one or more first parameters including one or more margins of error that are greater than one or more margins of error comprised in a second communication scheme to be used after transmitting the sounding reference signal.

At 530, the UE 115-b may determine a plurality of sub-periods of the second periodic cadence, and at least one of the plurality of sub-periods is non-uniform as compared to one or more other sub-periods of the plurality of sub-periods, and one or more transitions between sub-periods align, within a second threshold, with the periodic downlink bursts of multimedia data traffic.

At 535, the UE 115-b may determine one or more candidate slots for transmission of the sounding reference signals based on a subframe number, the sounding reference signal cadence parameter, the sounding reference signal offset parameter, or any combination thereof. Additionally or alternatively, the UE 115-b may select one or more of the candidate slots.

At 540, the UE 115-b may align, within a first threshold, a beginning of a period of the second periodic cadence with a beginning of a first period of the first periodic cadence. Additionally or alternatively, the UE 115-b may align, within a second threshold, an end of the period of the second periodic cadence with an end of a second period of the first periodic cadence.

At 545, the UE 115-b may transmit the sounding reference signals to the base station in accordance with the second periodic cadence. In some examples, the UE 115-b may transmit a plurality of additional sounding reference signals within a period of the second periodic cadence in accordance with the plurality of sub-periods. In some examples, the UE 115-b may transmit the sounding reference signals based on the frequency hopping scheme. In some examples, the UE 115-b may transmit the sounding reference signals based on the sounding reference signal cadence parameter. In some examples, the UE 115-b may transmit the sounding reference signals based on the sounding reference signal offset parameter. In some examples, the UE 115-b may transmit the sounding reference signals in the one or more selected candidate slots. In some examples, the UE 115-b may transmit the sounding reference signals based on the frequency hopping scheme.

Additionally or alternatively, the UE 115-b may transmit, to the base station, the sounding reference signal based on the first control signaling. In some examples, the UE 115-b may transmit the sounding reference signal in the slot that is the number of slots before the beginning of the periodic downlink bursts. In some examples, the UE 115-b may transmit the sounding reference signal in the earliest-available slot following the slot in which the periodic downlink bursts begin. In some examples, transmitting the sounding reference signal in the earliest-available slot following the slot in which the periodic downlink bursts begin may include transmitting the sounding reference signal based on the period of the periodic downlink bursts and the offset.

Figure 6:
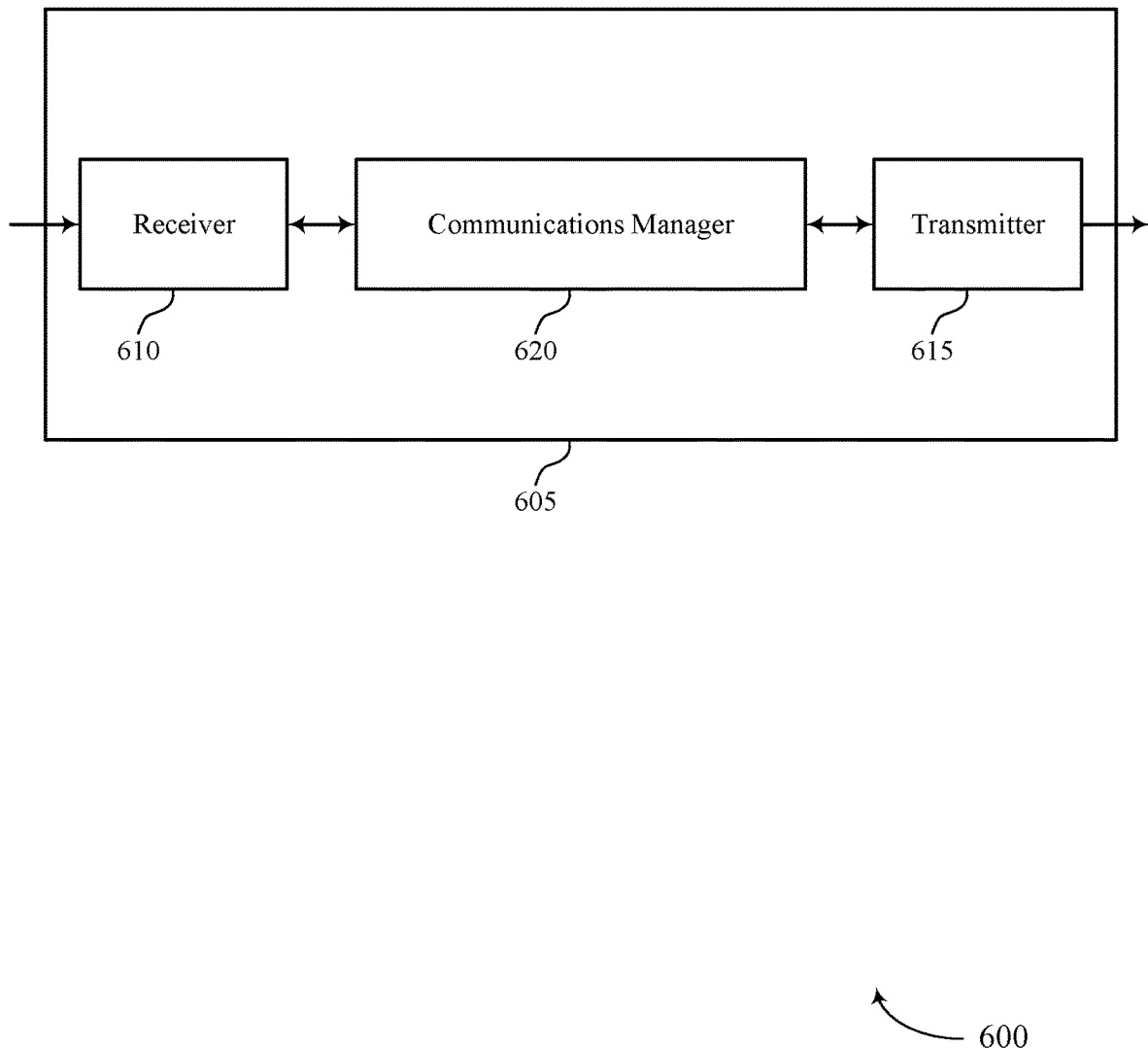
FIGS. 6 and 7 show block diagrams of devices that support sounding reference signal coordination for periodic traffic in accordance with aspects of the present disclosure.

FIG. 6 shows a block diagram 600 of a device 605 that supports sounding reference signal coordination for periodic traffic in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sounding reference signal coordination for periodic traffic). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sounding reference signal coordination for periodic traffic). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sounding reference signal coordination for periodic traffic as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, a downlink control information message scheduling periodic downlink bursts of multimedia data traffic, the periodic downlink bursts of multimedia data traffic having a first periodic cadence. The communications manager 620 may be configured as or otherwise support a means for receiving, from the base station, control signaling that indicates that the UE is to periodically transmit sounding reference signals to the base station in accordance with a second periodic cadence, where the second periodic cadence is a multiple of the first periodic cadence. The communications manager 620 may be configured as or otherwise support a means for transmitting the sounding reference signals to the base station in accordance with the second periodic cadence.

Additionally or alternatively, the communications manager 620 may support wireless communications at a UE in accordance with examples as disclosed herein. For example, the communications manager 620 may be configured as or otherwise support a means for receiving, from a base station, a downlink control information message scheduling periodic downlink bursts of multimedia data traffic. The communications manager 620 may be configured as or otherwise support a means for receiving, from the base station, first control signaling that indicates that the UE is to transmit a sounding reference signal at a time that is associated with a beginning of at least one of the periodic downlink bursts of multimedia data traffic. The communications manager 620 may be configured as or otherwise support a means for transmitting, to the base station, the sounding reference signal based on the first control signaling.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources, or a combination thereof.

Figure 7:
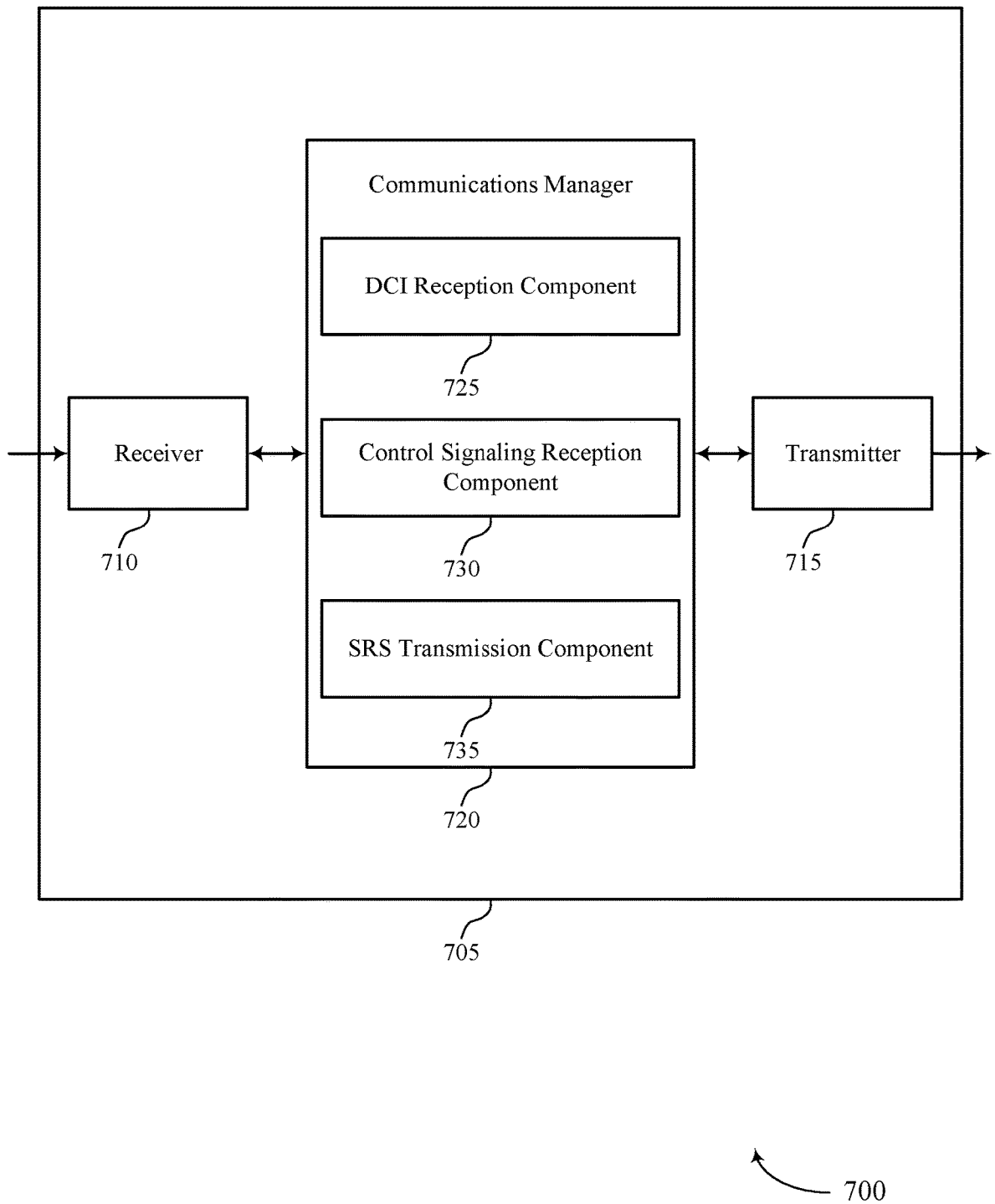

FIG. 7 shows a block diagram 700 of a device 705 that supports sounding reference signal coordination for periodic traffic in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sounding reference signal coordination for periodic traffic). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sounding reference signal coordination for periodic traffic). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sounding reference signal coordination for periodic traffic as described herein. For example, the communications manager 720 may include a DCI reception component 725, a control signaling reception component 730, an SRS transmission component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The DCI reception component 725 may be configured as or otherwise support a means for receiving, from a base station, a downlink control information message scheduling periodic downlink bursts of multimedia data traffic, the periodic downlink bursts of multimedia data traffic having a first periodic cadence. The control signaling reception component 730 may be configured as or otherwise support a means for receiving, from the base station, control signaling that indicates that the UE is to periodically transmit sounding reference signals to the base station in accordance with a second periodic cadence, where the second periodic cadence is a multiple of the first periodic cadence. The SRS transmission component 735 may be configured as or otherwise support a means for transmitting the sounding reference signals to the base station in accordance with the second periodic cadence.

Additionally or alternatively, the communications manager 720 may support wireless communications at a UE in accordance with examples as disclosed herein. The DCI reception component 725 may be configured as or otherwise support a means for receiving, from a base station, a downlink control information message scheduling periodic downlink bursts of multimedia data traffic. The control signaling reception component 730 may be configured as or otherwise support a means for receiving, from the base station, first control signaling that indicates that the UE is to transmit a sounding reference signal at a time that is associated with a beginning of at least one of the periodic downlink bursts of multimedia data traffic. The SRS transmission component 735 may be configured as or otherwise support a means for transmitting, to the base station, the sounding reference signal based on the first control signaling.

FIG. 8 shows a block diagram 800 of a communications manager 820 that supports sounding reference signal coordination for periodic traffic in accordance with aspects of the present disclosure. The communications manager 820 may be an example of aspects of a communications manager 620, a communications manager 720, or both, as described herein. The communications manager 820, or various components thereof, may be an example of means for performing various aspects of sounding reference signal coordination for periodic traffic as described herein. For example, the communications manager 820 may include a DCI reception component 825, a control signaling reception component 830, an SRS transmission component 835, an SRS alignment component 840, a sub-period component 845, a frequency hopping component 850, an SRS offset component 855, a DRX coordination component 860, a candidate slot component 865, or any combination thereof. Each of these components may communicate, directly or indirectly, with one another (e.g., via one or more buses).

The communications manager 820 may support wireless communications at a UE in accordance with examples as disclosed herein. The DCI reception component 825 may be configured as or otherwise support a means for receiving, from a base station, a downlink control information message scheduling periodic downlink bursts of multimedia data traffic, the periodic downlink bursts of multimedia data traffic having a first periodic cadence. The control signaling reception component 830 may be configured as or otherwise support a means for receiving, from the base station, control signaling that indicates that the UE is to periodically transmit sounding reference signals to the base station in accordance with a second periodic cadence, where the second periodic cadence is a multiple of the first periodic cadence. The SRS transmission component 835 may be configured as or otherwise support a means for transmitting the sounding reference signals to the base station in accordance with the second periodic cadence.

In some examples, the SRS alignment component 840 may be configured as or otherwise support a means for aligning, within a first threshold, a beginning of a period of the second periodic cadence with a beginning of a first period of the first periodic cadence. In some examples, the SRS alignment component 840 may be configured as or otherwise support a means for aligning, within a second threshold, an end of the period of the second periodic cadence with an end of a second period of the first periodic cadence.

In some examples, the sub-period component 845 may be configured as or otherwise support a means for determining a set of multiple sub-periods of the second periodic cadence, where at least one of the set of multiple sub-periods is non-uniform as compared to one or more other sub-periods of the set of multiple sub-periods, and one or more transitions between sub-periods align, within a second threshold, with the periodic downlink bursts of multimedia data traffic. In some examples, the sub-period component 845 may be configured as or otherwise support a means for transmitting a set of multiple additional sounding reference signals within a period of the second periodic cadence in accordance with the set of multiple sub-periods.

In some examples, the control signaling further indicates a value for a sounding reference signal cadence parameter that defines the second periodic cadence.

In some examples, the frequency hopping component 850 may be configured as or otherwise support a means for receiving control signaling, from the base station, that indicates a frequency hopping scheme based on a first counter corresponding to the second periodic cadence, a number of sub-periods contained within the second periodic cadence, and a sub-period index that identifies a sub-period contained within the second periodic cadence. In some examples, the frequency hopping component 850 may be configured as or otherwise support a means for transmitting the sounding reference signals based on the frequency hopping scheme.

In some examples, the control signaling reception component 830 may be configured as or otherwise support a means for receiving control signaling, from the base station, that indicates a sounding reference signal cadence parameter associated with the second periodic cadence and including a first value measured in hertz that defines the second periodic cadence. In some examples, the SRS transmission component 835 may be configured as or otherwise support a means for transmitting the sounding reference signals based on the sounding reference signal cadence parameter.

In some examples, the control signaling reception component 830 may be configured as or otherwise support a means for receiving control signaling, from the base station, that indicates a sounding reference signal offset parameter associated with the second periodic cadence and including a second value that corresponds to the first value. In some examples, the SRS transmission component 835 may be configured as or otherwise support a means for transmitting the sounding reference signals based on the sounding reference signal offset parameter.

In some examples, the candidate slot component 865 may be configured as or otherwise support a means for determining one or more candidate slots for transmission of the sounding reference signals based on a subframe number, the sounding reference signal cadence parameter, the sounding reference signal offset parameter, or any combination thereof. In some examples, the candidate slot component 865 may be configured as or otherwise support a means for selecting one or more of the one or more candidate slots. In some examples, the SRS transmission component 835 may be configured as or otherwise support a means for transmitting the sounding reference signals in the one or more selected candidate slots.

In some examples, the frequency hopping component 850 may be configured as or otherwise support a means for receiving control signaling, from the base station, that indicates a frequency hopping scheme based on the sounding reference signal cadence parameter, a system frame number, and a subframe number. In some examples, the SRS transmission component 835 may be configured as or otherwise support a means for transmitting the sounding reference signals based on the frequency hopping scheme.

Additionally or alternatively, the communications manager 820 may support wireless communications at a UE in accordance with examples as disclosed herein. In some examples, the DCI reception component 825 may be configured as or otherwise support a means for receiving, from a base station, a downlink control information message scheduling periodic downlink bursts of multimedia data traffic. In some examples, the control signaling reception component 830 may be configured as or otherwise support a means for receiving, from the base station, first control signaling that indicates that the UE is to transmit a sounding reference signal at a time that is associated with a beginning of at least one of the periodic downlink bursts of multimedia data traffic. In some examples, the SRS transmission component 835 may be configured as or otherwise support a means for transmitting, to the base station, the sounding reference signal based on the first control signaling.

In some examples, to support receiving the first control signaling, the control signaling reception component 830 may be configured as or otherwise support a means for receiving the first control signaling, from the base station, that indicates that the UE is to transmit the sounding reference signal in a slot that is a number of slots before a beginning of the periodic downlink bursts, the number being greater than a number of slots corresponding to a time period utilized by the base station to process the sounding reference signal; where the sounding reference signal is transmitted in the slot that is the number of slots before the beginning of the periodic downlink bursts.

In some examples, to support receiving the first control signaling, the SRS offset component 855 may be configured as or otherwise support a means for receiving the first control signaling, from the base station, that indicates that the UE is to transmit the sounding reference signal based on a period of the periodic downlink bursts and further indicates an offset corresponding with the number of slots before the beginning of the periodic downlink bursts, where the sounding reference signal is transmitted based on the period of the periodic downlink bursts and the offset.

In some examples, to support receiving the first control signaling, the control signaling reception component 830 may be configured as or otherwise support a means for receiving the first control signaling, from the base station, that indicates an uplink shared channel time domain allocation parameter, where the number of slots before the beginning of the periodic downlink bursts is based on the uplink shared channel time domain allocation parameter.

In some examples, to support receiving the first control signaling, the DRX coordination component 860 may be configured as or otherwise support a means for receiving the first control signaling, from the base station, that indicates that the UE is to transmit the sounding reference signal in a slot associated with an active period of a discontinuous reception scheme, where the sounding reference signal is transmitted in the slot associated with the active period.

In some examples, to support receiving the first control signaling, the DRX coordination component 860 may be configured as or otherwise support a means for receiving the first control signaling, from the base station, that indicates an uplink shared channel time domain allocation parameter and further indicates that the active period of the discontinuous reception scheme is scheduled to begin before the slot in which the sounding reference signal is to be transmitted, where the number of slots before the beginning of the periodic downlink bursts is based on the uplink shared channel time domain allocation parameter.

In some examples, the control signaling reception component 830 may be configured as or otherwise support a means for receiving second control signaling, from the base station, that indicates that the UE is to transmit the sounding reference signal at an earliest-available slot following a slot in which the periodic downlink bursts begin. In some examples, the SRS transmission component 835 may be configured as or otherwise support a means for transmitting the sounding reference signal in the earliest-available slot following the slot in which the periodic downlink bursts begin.

In some examples, the SRS offset component 855 may be configured as or otherwise support a means for receiving the first control signaling, from the base station, that indicates that the UE is to transmit the sounding reference signal based on a period of the periodic downlink bursts and an offset that matches the earliest-available slot following the slot in which the periodic downlink bursts begin. In some examples, the SRS transmission component 835 may be configured as or otherwise support a means for where transmitting the sounding reference signal in the earliest-available slot following the slot in which the periodic downlink bursts begin includes transmitting the sounding reference signal based on the period of the periodic downlink bursts and the offset.

In some examples, the control signaling reception component 830 may be configured as or otherwise support a means for receiving the first control signaling and the second control signaling using a first communication scheme including one or more first parameters including one or more margins of error that are greater than one or more margins of error included in a second communication scheme to be used after transmitting the sounding reference signal.

Figure 9:
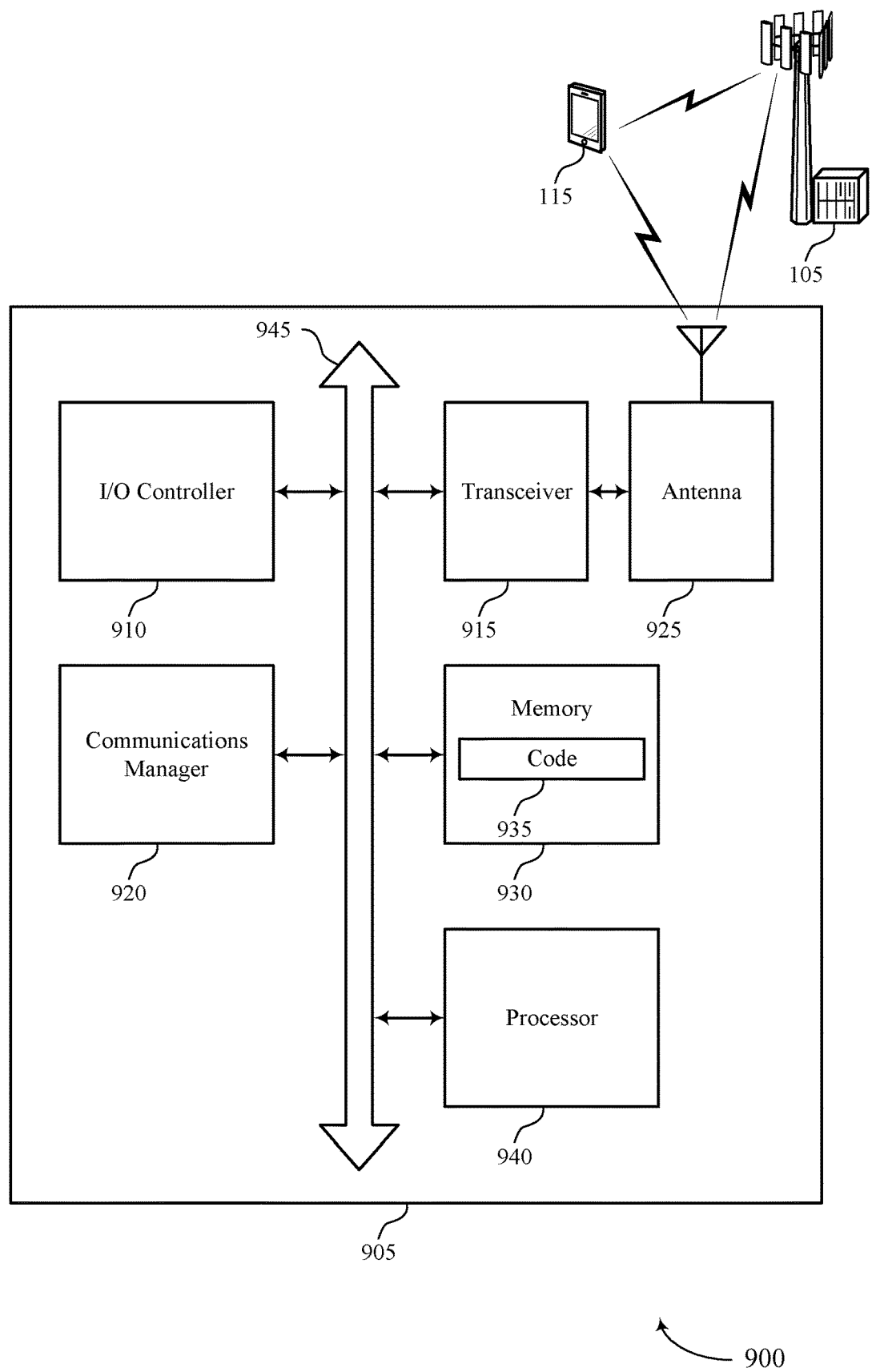
FIG. 9 shows a diagram of a system including a device that supports sounding reference signal coordination for periodic traffic in accordance with aspects of the present disclosure.

FIG. 9 shows a diagram of a system 900 including a device 905 that supports sounding reference signal coordination for periodic traffic in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sounding reference signal coordination for periodic traffic). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, a downlink control information message scheduling periodic downlink bursts of multimedia data traffic, the periodic downlink bursts of multimedia data traffic having a first periodic cadence. The communications manager 920 may be configured as or otherwise support a means for receiving, from the base station, control signaling that indicates that the UE is to periodically transmit sounding reference signals to the base station in accordance with a second periodic cadence, where the second periodic cadence is a multiple of the first periodic cadence. The communications manager 920 may be configured as or otherwise support a means for transmitting the sounding reference signals to the base station in accordance with the second periodic cadence.

Additionally or alternatively, the communications manager 920 may support wireless communications at a UE in accordance with examples as disclosed herein. For example, the communications manager 920 may be configured as or otherwise support a means for receiving, from a base station, a downlink control information message scheduling periodic downlink bursts of multimedia data traffic. The communications manager 920 may be configured as or otherwise support a means for receiving, from the base station, first control signaling that indicates that the UE is to transmit a sounding reference signal at a time that is associated with a beginning of at least one of the periodic downlink bursts of multimedia data traffic. The communications manager 920 may be configured as or otherwise support a means for transmitting, to the base station, the sounding reference signal based on the first control signaling.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sounding reference signal coordination for periodic traffic as described herein, or the processor 940 and the memory 930 may be otherwise configured to perform or support such operations.

Figure 10:
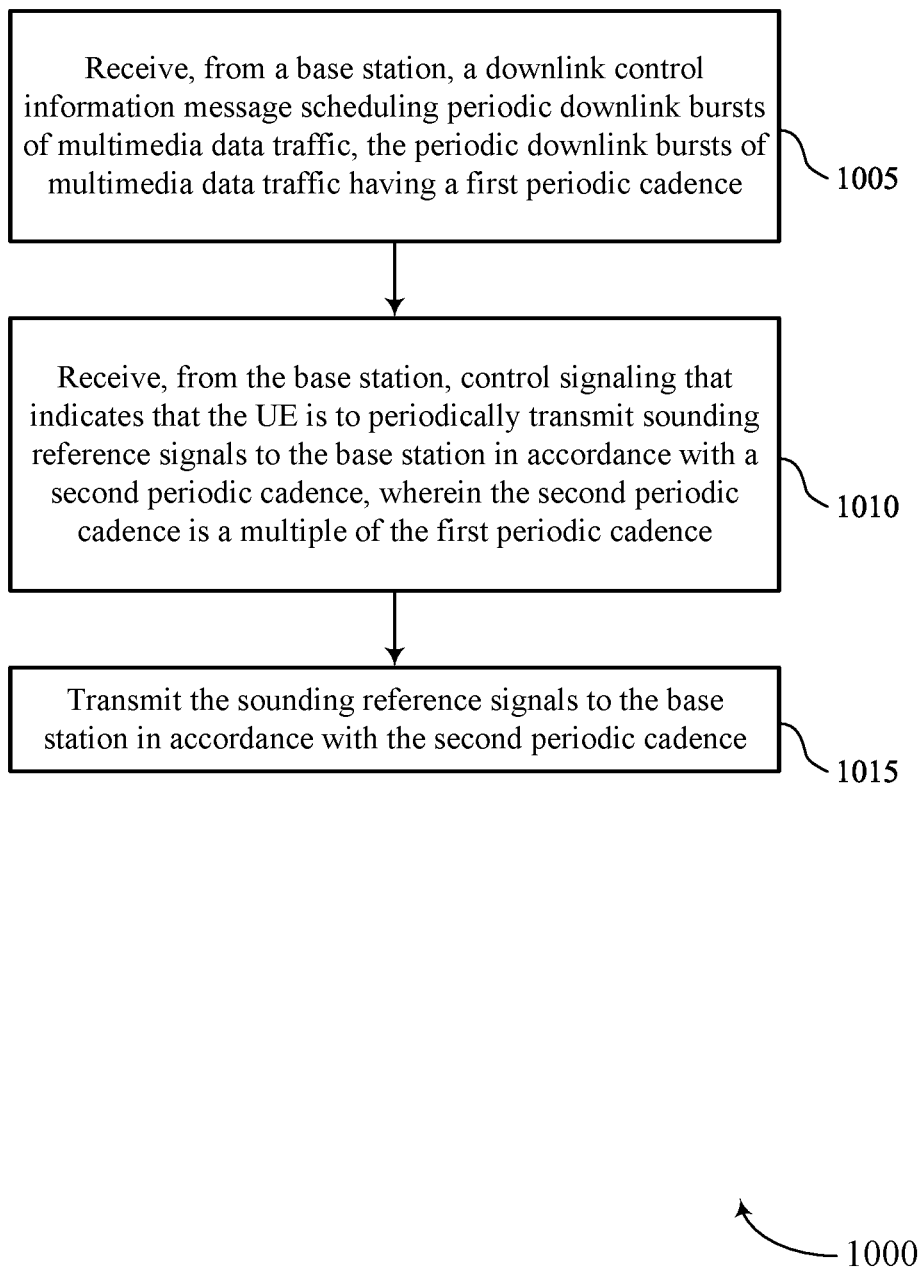
FIGS. 10 through 15 show flowcharts illustrating methods that support sounding reference signal coordination for periodic traffic in accordance with aspects of the present disclosure.

FIG. 10 shows a flowchart illustrating a method 1000 that supports sounding reference signal coordination for periodic traffic in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, a downlink control information message scheduling periodic downlink bursts of multimedia data traffic, the periodic downlink bursts of multimedia data traffic having a first periodic cadence. The operations of 1005 may be performed in accordance with examples as disclosed herein. In some examples, aspects of the operations of 1005 may be performed by a DCI reception component 825 as described with reference to FIG. 8.

At 1010, the method may include receiving, from the base station, control signaling that indicates that the UE is to periodically transmit sounding reference signals to the base station in accordance with a second periodic cadence, where the second periodic cadence is a multiple of the first periodic cadence. The operations of 1010 may be performed in accordance with examples as disclosed herein. In some examples, aspects of the operations of 1010 may be performed by a control signaling reception component 830 as described with reference to FIG. 8.

At 1015, the method may include transmitting the sounding reference signals to the base station in accordance with the second periodic cadence. The operations of 1015 may be performed in accordance with examples as disclosed herein. In some examples, aspects of the operations of 1015 may be performed by an SRS transmission component 835 as described with reference to FIG. 8.

Figure 11:
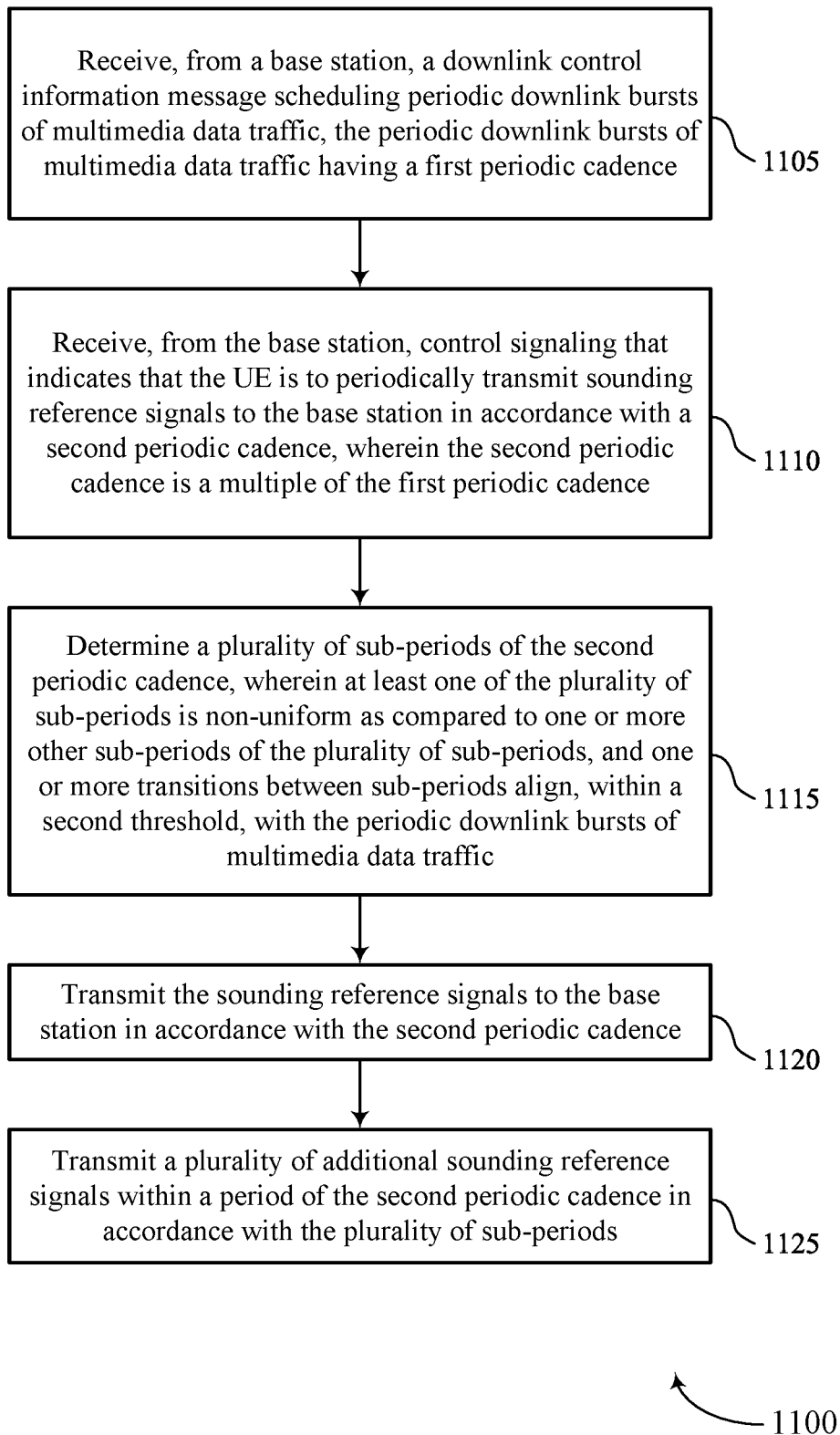

FIG. 11 shows a flowchart illustrating a method 1100 that supports sounding reference signal coordination for periodic traffic in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, a downlink control information message scheduling periodic downlink bursts of multimedia data traffic, the periodic downlink bursts of multimedia data traffic having a first periodic cadence. The operations of 1105 may be performed in accordance with examples as disclosed herein. In some examples, aspects of the operations of 1105 may be performed by a DCI reception component 825 as described with reference to FIG. 8.

At 1110, the method may include receiving, from the base station, control signaling that indicates that the UE is to periodically transmit sounding reference signals to the base station in accordance with a second periodic cadence, where the second periodic cadence is a multiple of the first periodic cadence. The operations of 1110 may be performed in accordance with examples as disclosed herein. In some examples, aspects of the operations of 1110 may be performed by a control signaling reception component 830 as described with reference to FIG. 8.

At 1115, the method may include determining a set of multiple sub-periods of the second periodic cadence, where at least one of the set of multiple sub-periods is non-uniform as compared to one or more other sub-periods of the set of multiple sub-periods, and one or more transitions between sub-periods align, within a second threshold, with the periodic downlink bursts of multimedia data traffic. The operations of 1115 may be performed in accordance with examples as disclosed herein. In some examples, aspects of the operations of 1115 may be performed by a sub-period component 845 as described with reference to FIG. 8.

At 1120, the method may include transmitting the sounding reference signals to the base station in accordance with the second periodic cadence. The operations of 1120 may be performed in accordance with examples as disclosed herein. In some examples, aspects of the operations of 1120 may be performed by an SRS transmission component 835 as described with reference to FIG. 8.

At 1125, the method may include transmitting a set of multiple additional sounding reference signals within a period of the second periodic cadence in accordance with the set of multiple sub-periods. The operations of 1125 may be performed in accordance with examples as disclosed herein. In some examples, aspects of the operations of 1125 may be performed by a sub-period component 845 as described with reference to FIG. 8.

Figure 12:
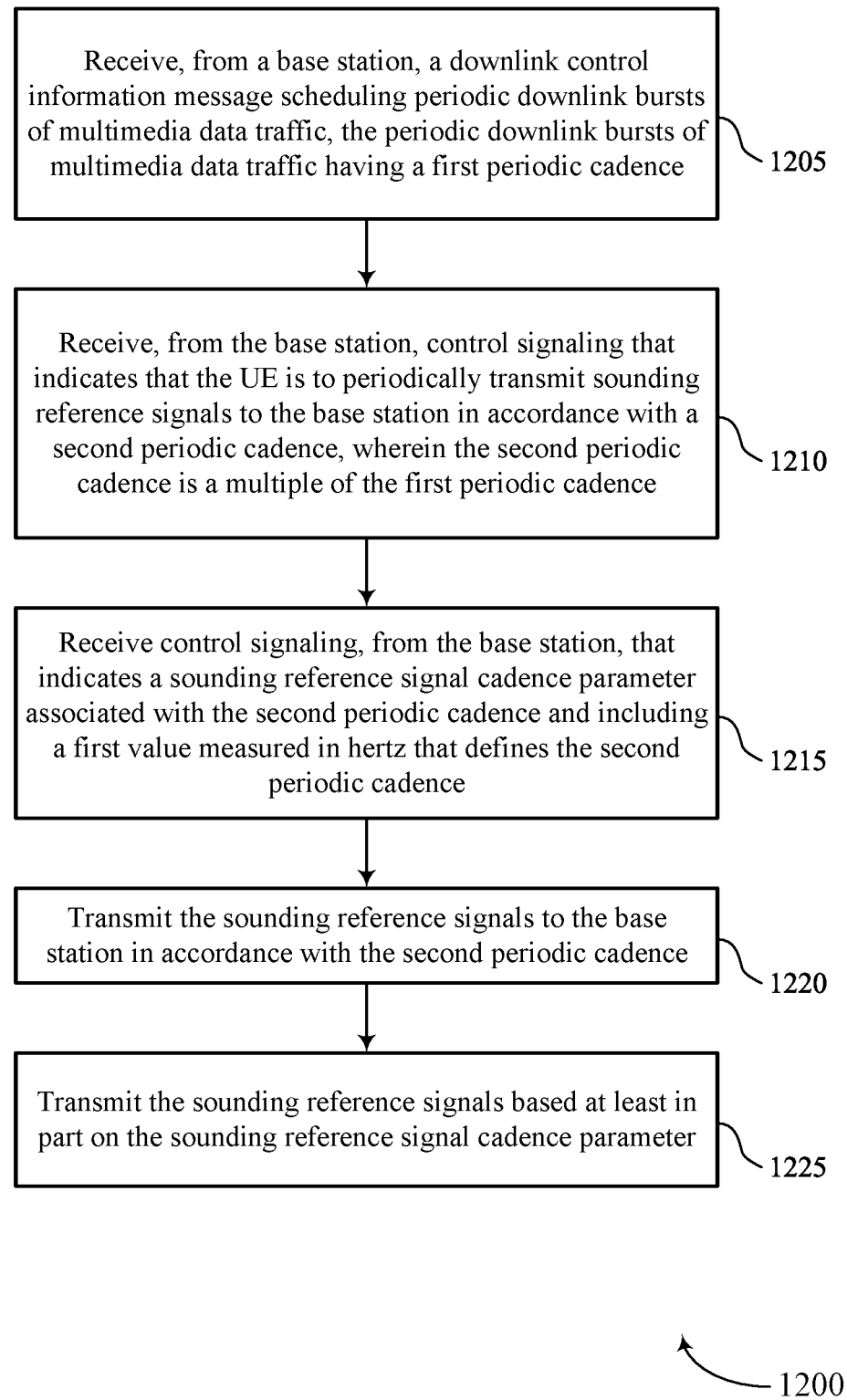

FIG. 12 shows a flowchart illustrating a method 1200 that supports sounding reference signal coordination for periodic traffic in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a downlink control information message scheduling periodic downlink bursts of multimedia data traffic, the periodic downlink bursts of multimedia data traffic having a first periodic cadence. The operations of 1205 may be performed in accordance with examples as disclosed herein. In some examples, aspects of the operations of 1205 may be performed by a DCI reception component 825 as described with reference to FIG. 8.

At 1210, the method may include receiving, from the base station, control signaling that indicates that the UE is to periodically transmit sounding reference signals to the base station in accordance with a second periodic cadence, where the second periodic cadence is a multiple of the first periodic cadence. The operations of 1210 may be performed in accordance with examples as disclosed herein. In some examples, aspects of the operations of 1210 may be performed by a control signaling reception component 830 as described with reference to FIG. 8.

At 1215, the method may include receiving control signaling, from the base station, that indicates a sounding reference signal cadence parameter associated with the second periodic cadence and including a first value measured in hertz that defines the second periodic cadence. The operations of 1215 may be performed in accordance with examples as disclosed herein. In some examples, aspects of the operations of 1215 may be performed by a control signaling reception component 830 as described with reference to FIG. 8.

At 1220, the method may include transmitting the sounding reference signals to the base station in accordance with the second periodic cadence. The operations of 1220 may be performed in accordance with examples as disclosed herein. In some examples, aspects of the operations of 1220 may be performed by an SRS transmission component 835 as described with reference to FIG. 8.

At 1225, the method may include transmitting the sounding reference signals based on the sounding reference signal cadence parameter. The operations of 1225 may be performed in accordance with examples as disclosed herein. In some examples, aspects of the operations of 1225 may be performed by an SRS transmission component 835 as described with reference to FIG. 8.

Figure 13:
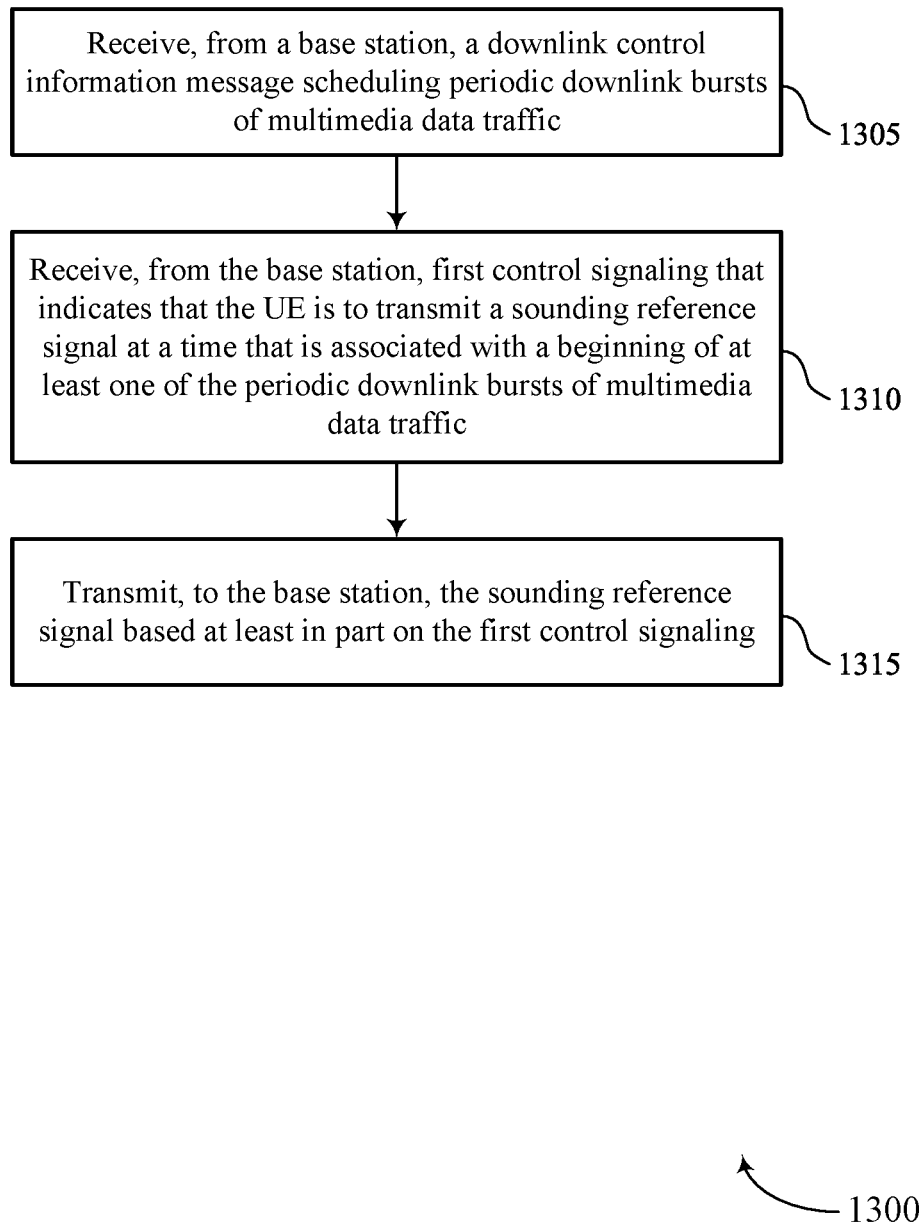

FIG. 13 shows a flowchart illustrating a method 1300 that supports sounding reference signal coordination for periodic traffic in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a downlink control information message scheduling periodic downlink bursts of multimedia data traffic. The operations of 1305 may be performed in accordance with examples as disclosed herein. In some examples, aspects of the operations of 1305 may be performed by a DCI reception component 825 as described with reference to FIG. 8.

At 1310, the method may include receiving, from the base station, first control signaling that indicates that the UE is to transmit a sounding reference signal at a time that is associated with a beginning of at least one of the periodic downlink bursts of multimedia data traffic. The operations of 1310 may be performed in accordance with examples as disclosed herein. In some examples, aspects of the operations of 1310 may be performed by a control signaling reception component 830 as described with reference to FIG. 8.

At 1315, the method may include transmitting, to the base station, the sounding reference signal based on the first control signaling. The operations of 1315 may be performed in accordance with examples as disclosed herein. In some examples, aspects of the operations of 1315 may be performed by an SRS transmission component 835 as described with reference to FIG. 8.

Figure 14:
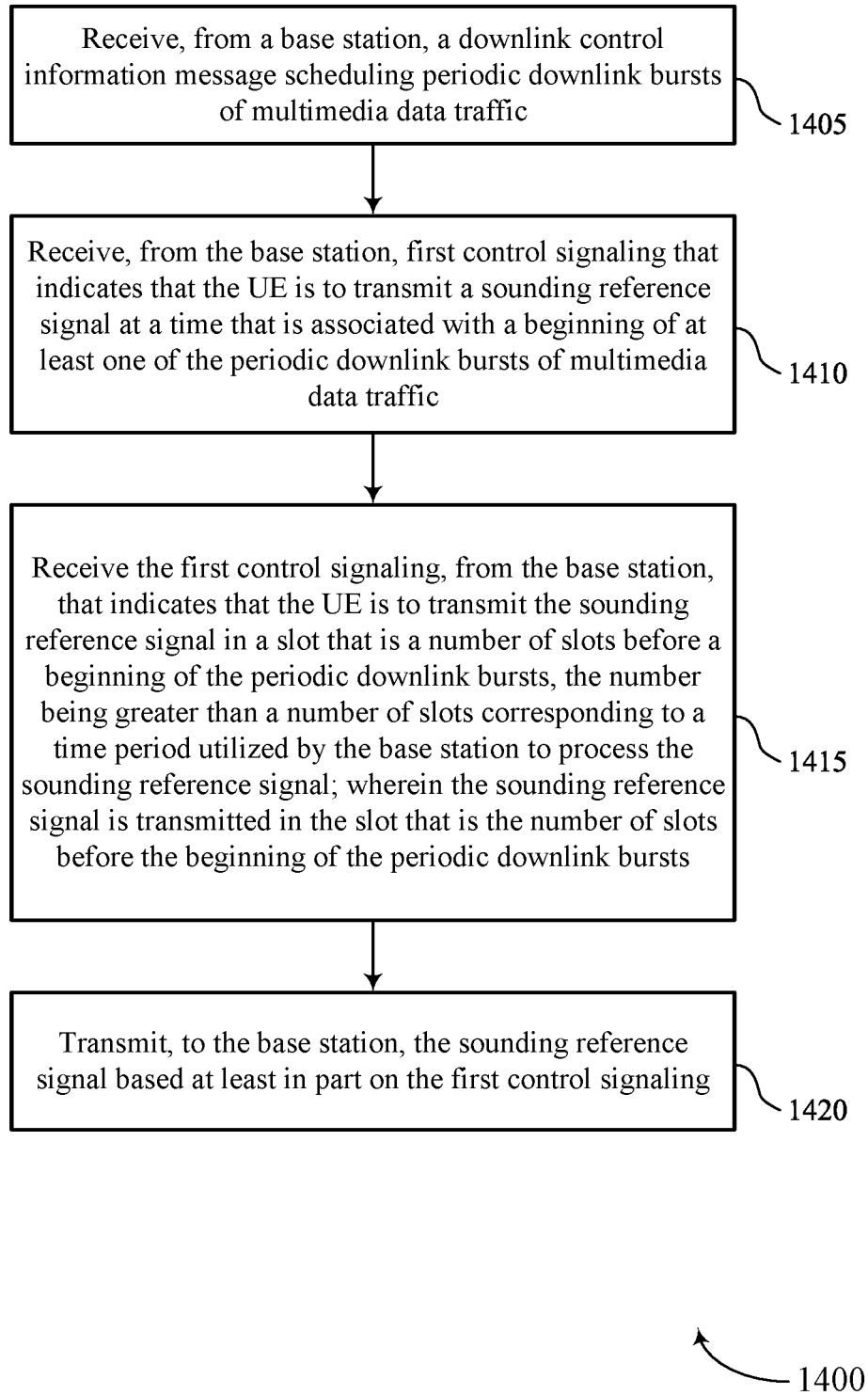

FIG. 14 shows a flowchart illustrating a method 1400 that supports sounding reference signal coordination for periodic traffic in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a downlink control information message scheduling periodic downlink bursts of multimedia data traffic. The operations of 1405 may be performed in accordance with examples as disclosed herein. In some examples, aspects of the operations of 1405 may be performed by a DCI reception component 825 as described with reference to FIG. 8.

At 1410, the method may include receiving, from the base station, first control signaling that indicates that the UE is to transmit a sounding reference signal at a time that is associated with a beginning of at least one of the periodic downlink bursts of multimedia data traffic. The operations of 1410 may be performed in accordance with examples as disclosed herein. In some examples, aspects of the operations of 1410 may be performed by a control signaling reception component 830 as described with reference to FIG. 8.

At 1415, the method may include receiving the first control signaling, from the base station, that indicates that the UE is to transmit the sounding reference signal in a slot that is a number of slots before a beginning of the periodic downlink bursts, the number being greater than a number of slots corresponding to a time period utilized by the base station to process the sounding reference signal; where the sounding reference signal is transmitted in the slot that is the number of slots before the beginning of the periodic downlink bursts. The operations of 1415 may be performed in accordance with examples as disclosed herein. In some examples, aspects of the operations of 1415 may be performed by a control signaling reception component 830 as described with reference to FIG. 8.

At 1420, the method may include transmitting, to the base station, the sounding reference signal based on the first control signaling. The operations of 1420 may be performed in accordance with examples as disclosed herein. In some examples, aspects of the operations of 1420 may be performed by an SRS transmission component 835 as described with reference to FIG. 8.

Figure 15:
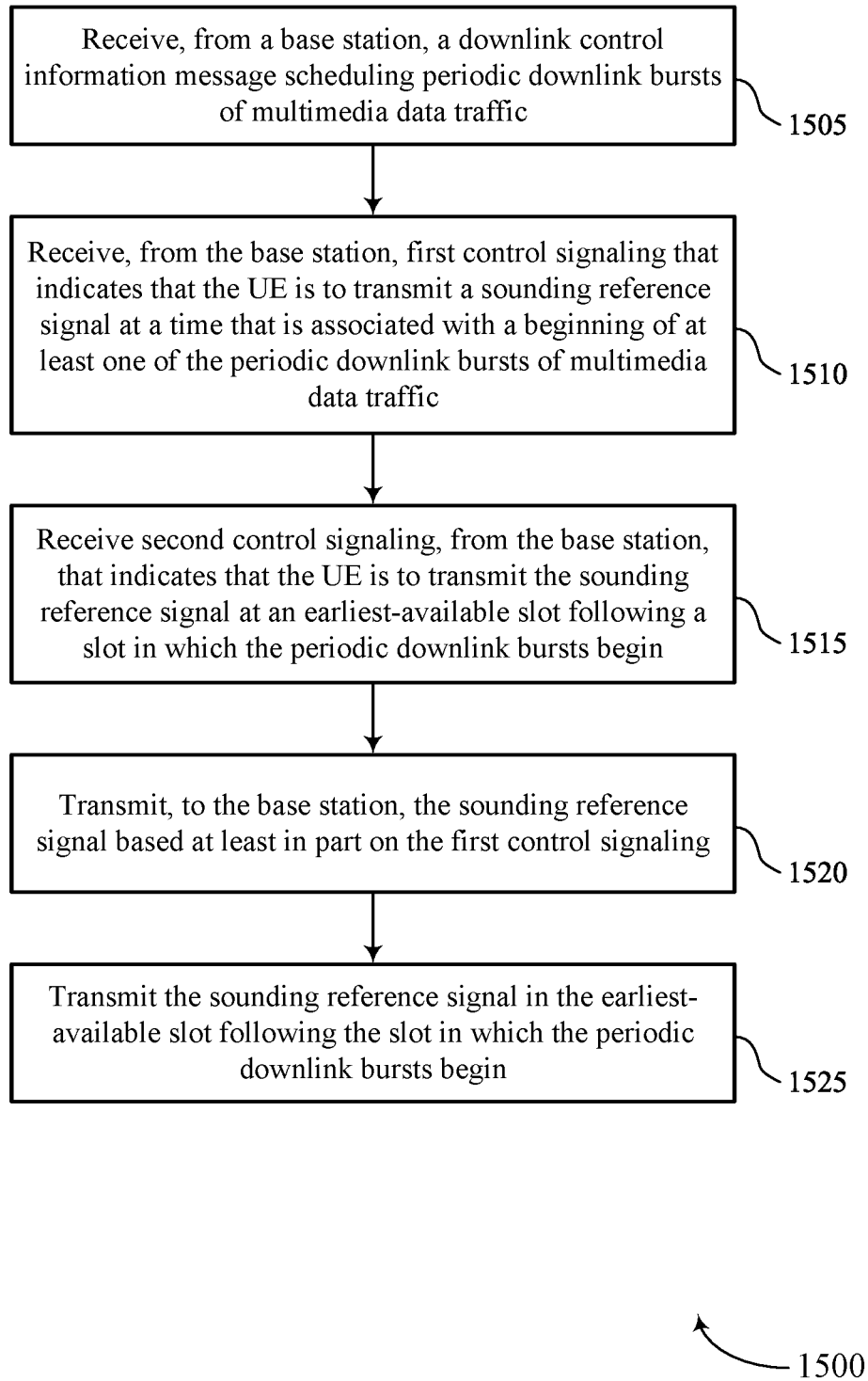

FIG. 15 shows a flowchart illustrating a method 1500 that supports sounding reference signal coordination for periodic traffic in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a downlink control information message scheduling periodic downlink bursts of multimedia data traffic. The operations of 1505 may be performed in accordance with examples as disclosed herein. In some examples, aspects of the operations of 1505 may be performed by a DCI reception component 825 as described with reference to FIG. 8.

At 1510, the method may include receiving, from the base station, first control signaling that indicates that the UE is to transmit a sounding reference signal at a time that is associated with a beginning of at least one of the periodic downlink bursts of multimedia data traffic. The operations of 1510 may be performed in accordance with examples as disclosed herein. In some examples, aspects of the operations of 1510 may be performed by a control signaling reception component 830 as described with reference to FIG. 8.

At 1515, the method may include receiving second control signaling, from the base station, that indicates that the UE is to transmit the sounding reference signal at an earliest-available slot following a slot in which the periodic downlink bursts begin. The operations of 1515 may be performed in accordance with examples as disclosed herein. In some examples, aspects of the operations of 1515 may be performed by a control signaling reception component 830 as described with reference to FIG. 8.

At 1520, the method may include transmitting, to the base station, the sounding reference signal based on the first control signaling. The operations of 1520 may be performed in accordance with examples as disclosed herein. In some examples, aspects of the operations of 1520 may be performed by an SRS transmission component 835 as described with reference to FIG. 8.

At 1525, the method may include transmitting the sounding reference signal in the earliest-available slot following the slot in which the periodic downlink bursts begin. The operations of 1525 may be performed in accordance with examples as disclosed herein. In some examples, aspects of the operations of 1525 may be performed by an SRS transmission component 835 as described with reference to FIG. 8.

The following provides an overview of aspects of the present disclosure:

Aspect 1: A method for wireless communications at a UE, comprising: receiving, from a base station, a downlink control information message scheduling periodic downlink bursts of multimedia data traffic, the periodic downlink bursts of multimedia data traffic having a first periodic cadence; receiving, from the base station, control signaling that indicates that the UE is to periodically transmit sounding reference signals to the base station in accordance with a second periodic cadence, wherein the second periodic cadence is a multiple of the first periodic cadence; and transmitting the sounding reference signals to the base station in accordance with the second periodic cadence.

Aspect 2: The method of aspect 1, further comprising: aligning, within a first threshold, a beginning of a second period of the second periodic cadence with a beginning of a first period of the first periodic cadence; and aligning, within a second threshold, an end of the period of the second periodic cadence with an end of a second period of the first periodic cadence.

Aspect 3: The method of any of aspects 1 through 2, further comprising: determining a plurality of sub-periods of the second periodic cadence, wherein at least one of the plurality of sub-periods is non-uniform as compared to one or more other sub-periods of the plurality of sub-periods, and one or more transitions between sub-periods align, within a second threshold, with the periodic downlink bursts of multimedia data traffic; and transmitting a plurality of additional sounding reference signals within a period of the second periodic cadence in accordance with the plurality of sub-periods.

Aspect 4: The method of any of aspects 1 through 3, wherein the control signaling further indicates a value for a sounding reference signal cadence parameter that defines the second periodic cadence.

Aspect 5: The method of any of aspects 1 through 4, further comprising: receiving control signaling, from the base station, that indicates a frequency hopping scheme based at least in part on a first counter corresponding to the second periodic cadence, a number of sub-periods contained within the second periodic cadence, and a sub-period index that identifies a sub-period contained within the second periodic cadence; and transmitting the sounding reference signals based at least in part on the frequency hopping scheme.

Aspect 6: The method of any of aspects 1 through 5, further comprising: receiving control signaling, from the base station, that indicates a sounding reference signal cadence parameter associated with the second periodic cadence and including a first value measured in hertz that defines the second periodic cadence; and transmitting the sounding reference signals based at least in part on the sounding reference signal cadence parameter.

Aspect 7: The method of aspect 6, further comprising: receiving control signaling, from the base station, that indicates a sounding reference signal offset parameter associated with the second periodic cadence and including a second value that corresponds to the first value; and transmitting the sounding reference signals based at least in part on the sounding reference signal offset parameter.

Aspect 8: The method of aspect 7, further comprising: determining one or more candidate slots for transmission of the sounding reference signals based at least in part on a subframe number, the sounding reference signal cadence parameter, the sounding reference signal offset parameter, or any combination thereof; selecting one or more of the one or more candidate slots; and transmitting the sounding reference signals in the one or more selected candidate slots.

Aspect 9: The method of any of aspects 6 through 8, further comprising: receiving control signaling, from the base station, that indicates a frequency hopping scheme based at least in part on the sounding reference signal cadence parameter, a system frame number, and a subframe number; and transmitting the sounding reference signals based at least in part on the frequency hopping scheme.

Aspect 10: A method for wireless communications at a UE, comprising: receiving, from a base station, a downlink control information message scheduling periodic downlink bursts of multimedia data traffic; receiving, from the base station, first control signaling that indicates that the UE is to transmit a sounding reference signal at a time that is associated with a beginning of at least one of the periodic downlink bursts of multimedia data traffic; and transmitting, to the base station, the sounding reference signal based at least in part on the first control signaling.

Aspect 11: The method of aspect 10, wherein receiving the first control signaling further comprises: receiving the first control signaling, from the base station, that indicates that the UE is to transmit the sounding reference signal in a slot that is a number of slots before a beginning of the periodic downlink bursts, the number being greater than a number of slots corresponding to a time period utilized by the base station to process the sounding reference signal; wherein the sounding reference signal is transmitted in the slot that is the number of slots before the beginning of the periodic downlink bursts.

Aspect 12: The method of aspect 11, wherein receiving the first control signaling further comprises: receiving the first control signaling, from the base station, that indicates that the UE is to transmit the sounding reference signal based at least in part on a period of the periodic downlink bursts and further indicates an offset corresponding with the number of slots before the beginning of the periodic downlink bursts, wherein the sounding reference signal is transmitted based at least in part on the period of the periodic downlink bursts and the offset.

Aspect 13: The method of any of aspects 11 through 12, wherein receiving the first control signaling further comprises: receiving the first control signaling, from the base station, that indicates an uplink shared channel time domain allocation parameter, wherein the number of slots before the beginning of the periodic downlink bursts is based at least in part on the uplink shared channel time domain allocation parameter.

Aspect 14: The method of any of aspects 11 through 13, wherein receiving the first control signaling further comprises: receiving the first control signaling, from the base station, that indicates that the UE is to transmit the sounding reference signal in a slot associated with an active period of a discontinuous reception scheme, wherein the sounding reference signal is transmitted in the slot associated with the active period.

Aspect 15: The method of aspect 14, wherein receiving the first control signaling further comprises: receiving the first control signaling, from the base station, that indicates an uplink shared channel time domain allocation parameter and further indicates that the active period of the discontinuous reception scheme is scheduled to begin before the slot in which the sounding reference signal is to be transmitted, wherein the number of slots before the beginning of the periodic downlink bursts is based at least in part on the uplink shared channel time domain allocation parameter.

Aspect 16: The method of any of aspects 10 through 15, further comprising: receiving second control signaling, from the base station, that indicates that the UE is to transmit the sounding reference signal at an earliest-available slot following a slot in which the periodic downlink bursts begin; and transmitting the sounding reference signal in the earliest-available slot following the slot in which the periodic downlink bursts begin.

Aspect 17: The method of aspect 16, further comprising: receiving the first control signaling, from the base station, that indicates that the UE is to transmit the sounding reference signal based at least in part on a period of the periodic downlink bursts and an offset that matches the earliest-available slot following the slot in which the periodic downlink bursts begin; wherein transmitting the sounding reference signal in the earliest-available slot following the slot in which the periodic downlink bursts begin comprises transmitting the sounding reference signal based at least in part on the period of the periodic downlink bursts and the offset.

Aspect 18: The method of aspect 17, further comprising: receiving the first control signaling and the second control signaling using a first communication scheme comprising one or more first parameters comprising one or more margins of error that are greater than one or more margins of error comprised in a second communication scheme to be used after transmitting the sounding reference signal.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a UE, comprising a processor; memory coupled with the processor; and instructions stored in the memory and executable by the processor to cause the apparatus to perform a method of any of aspects 10 through 18.

Aspect 23: An apparatus for wireless communications at a UE, comprising at least one means for performing a method of any of aspects 10 through 18.

Aspect 24: A non-transitory computer-readable medium storing code for wireless communications at a UE, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving, from a base station, a downlink control information message scheduling periodic downlink bursts of multimedia data traffic, the periodic downlink bursts of multimedia data traffic having a first periodic cadence;
    receiving, from the base station, control signaling that indicates that the UE is to periodically transmit sounding reference signals to the base station in accordance with a second periodic cadence, wherein the second periodic cadence is a multiple of the first periodic cadence; and
    transmitting the sounding reference signals to the base station in accordance with the second periodic cadence.

2. The method of claim 1, further comprising:
    aligning, within a first threshold, a beginning of a period of the second periodic cadence with a beginning of a first period of the first periodic cadence; and
    aligning, within a second threshold, an end of the period of the second periodic cadence with an end of a second period of the first periodic cadence.

3. The method of claim 1, further comprising:
    determining a plurality of sub-periods of the second periodic cadence, wherein at least one of the plurality of sub-periods is non-uniform as compared to one or more other sub-periods of the plurality of sub-periods, and one or more transitions between sub-periods align, within a second threshold, with the periodic downlink bursts of multimedia data traffic; and
    transmitting a plurality of additional sounding reference signals within a period of the second periodic cadence in accordance with the plurality of sub-periods.

4. The method of claim 1, wherein the control signaling further indicates a value for a sounding reference signal cadence parameter that defines the second periodic cadence.

5. The method of claim 1, further comprising:
    receiving control signaling, from the base station, that indicates a frequency hopping scheme based at least in part on a first counter corresponding to the second periodic cadence, a number of sub-periods contained within the second periodic cadence, and a sub-period index that identifies a sub-period contained within the second periodic cadence; and
    transmitting the sounding reference signals based at least in part on the frequency hopping scheme.

6. The method of claim 1, further comprising:
    receiving control signaling, from the base station, that indicates a sounding reference signal cadence parameter associated with the second periodic cadence and including a first value measured in hertz that defines the second periodic cadence; and
    transmitting the sounding reference signals based at least in part on the sounding reference signal cadence parameter.

7. The method of claim 6, further comprising:
    receiving control signaling, from the base station, that indicates a sounding reference signal offset parameter associated with the second periodic cadence and including a second value that corresponds to the first value; and
    transmitting the sounding reference signals based at least in part on the sounding reference signal offset parameter.

8. The method of claim 7, further comprising:
    determining one or more candidate slots for transmission of the sounding reference signals based at least in part on a subframe number, the sounding reference signal cadence parameter, the sounding reference signal offset parameter, or any combination thereof;
    selecting one or more of the one or more candidate slots; and
    transmitting the sounding reference signals in the one or more selected candidate slots.

9. The method of claim 6, further comprising:
    receiving control signaling, from the base station, that indicates a frequency hopping scheme based at least in part on the sounding reference signal cadence parameter, a system frame number, and a subframe number; and
    transmitting the sounding reference signals based at least in part on the frequency hopping scheme.

10. A user equipment (UE) for wireless communications, comprising:
    a processor;
    memory coupled with the processor; and
    instructions stored in the memory and executable by the processor to cause the UE to:
        receive, from a base station, a downlink control information message scheduling periodic downlink bursts of multimedia data traffic, the periodic downlink bursts of multimedia data traffic having a first periodic cadence;

receive, from the base station, control signaling that indicates that the UE is to periodically transmit sounding reference signals to the base station in accordance with a second periodic cadence, wherein the second periodic cadence is a multiple of the first periodic cadence; and transmit the sounding reference signals to the base station in accordance with the second periodic cadence.

11. The UE of claim 10, wherein the instructions are further executable by the processor to cause the UE to:

align, within a first threshold, a beginning of a period of the second periodic cadence with a beginning of a first period of the first periodic cadence; and align, within a second threshold, an end of the period of the second periodic cadence with an end of a second period of the first periodic cadence.

12. The UE of claim 10, wherein the instructions are further executable by the processor to cause the UE to:

determine a plurality of sub-periods of the second periodic cadence, wherein at least one of the plurality of sub-periods is non-uniform as compared to one or more other sub-periods of the plurality of sub-periods, and one or more transitions between sub-periods align, within a second threshold, with the periodic downlink bursts of multimedia data traffic; and transmit a plurality of additional sounding reference signals within a period of the second periodic cadence in accordance with the plurality of sub-periods.

13. The UE of claim 10, wherein the control signaling further indicates a value for a sounding reference signal cadence parameter that defines the second periodic cadence.

14. The UE of claim 10, wherein the instructions are further executable by the processor to cause the UE to:

receive control signaling, from the base station, that indicates a frequency hopping scheme based at least in part on a first counter corresponding to the second periodic cadence, a number of sub-periods contained within the second periodic cadence, and a sub-period index that identifies a sub-period contained within the second periodic cadence; and transmit the sounding reference signals based at least in part on the frequency hopping scheme.

15. The UE of claim 10, wherein the instructions are further executable by the processor to cause the UE to:

receive control signaling, from the base station, that indicates a sounding reference signal cadence parameter associated with the second periodic cadence and including a first value measured in hertz that defines the second periodic cadence; and transmit the sounding reference signals based at least in part on the sounding reference signal cadence parameter.

* * * * *